US010589169B2

(12) United States Patent
Komori et al.

(10) Patent No.: US 10,589,169 B2
(45) Date of Patent: Mar. 17, 2020

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Akihiro Komori, Tokyo (JP); Ikuo Yamano, Tokyo (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 200 days.

(21) Appl. No.: 15/549,033

(22) PCT Filed: Feb. 26, 2016

(86) PCT No.: PCT/JP2016/055771
§ 371 (c)(1),
(2) Date: Aug. 4, 2017

(87) PCT Pub. No.: WO2016/136934
PCT Pub. Date: Sep. 1, 2016

(65) Prior Publication Data
US 2018/0243647 A1 Aug. 30, 2018

Related U.S. Application Data

(60) Provisional application No. 62/121,774, filed on Feb. 27, 2015.

(51) Int. Cl.
A63F 13/285 (2014.01)
A63F 13/22 (2014.01)
(Continued)

(52) U.S. Cl.
CPC .......... A63F 13/285 (2014.09); A63F 13/211 (2014.09); A63F 13/215 (2014.09);
(Continued)

(58) Field of Classification Search
CPC ...... A63F 13/211; A63F 13/23; A63F 13/235; A63F 13/24; A63F 13/285; A63F 13/428; A63F 13/57; G06F 3/016; G05F 5/03
(Continued)

(56) References Cited

U.S. PATENT DOCUMENTS

2007/0248235 A1    10/2007  Hamada et al.
2009/0069081 A1*    3/2009  Thorner .................. G06F 3/011
                                                                    463/30
(Continued)

FOREIGN PATENT DOCUMENTS

CN    103838423 A    6/2014
EP    2733575 A1    5/2014
(Continued)

OTHER PUBLICATIONS

International Search Report and Written Opinion of PCT Application No. PCT/JP2016/055771, dated May 17, 2016, 02 pages of English Translation and 07 pages of ISRWO.

Primary Examiner — Michael A Cuff
(74) Attorney, Agent, or Firm — Chip Law Group

(57) ABSTRACT

An information processing apparatus including a control section to generate a control signal that controls an operation of a tactile feedback apparatus including a tactile feedback section. The control section changes control on the tactile feedback apparatus on the basis of a type of the tactile feedback section which is recognized by the control section.

15 Claims, 22 Drawing Sheets

(51) Int. Cl.
    *G06F 3/01*     (2006.01)
    *A63F 13/23*     (2014.01)
    *A63F 13/215*     (2014.01)
    *G06F 3/0338*     (2013.01)
    *A63F 13/211*     (2014.01)
    *A63F 13/235*     (2014.01)
    *A63F 13/24*     (2014.01)
    *A63F 13/428*     (2014.01)
    *A63F 13/577*     (2014.01)

(52) U.S. Cl.
    CPC .............. *A63F 13/22* (2014.09); *A63F 13/23* (2014.09); *A63F 13/235* (2014.09); *A63F 13/24* (2014.09); *A63F 13/428* (2014.09); *A63F 13/577* (2014.09); *G06F 3/016* (2013.01); *G06F 3/0338* (2013.01); *G06F 2203/013* (2013.01)

(58) Field of Classification Search
    USPC .......................................................... 463/30
    See application file for complete search history.

(56) References Cited

U.S. PATENT DOCUMENTS

| | | | |
|---|---|---|---|
| 2009/0233710 A1* | 9/2009 | Roberts | A63F 13/06 463/30 |
| 2014/0139450 A1 | 5/2014 | Levesque et al. | |
| 2015/0180271 A1* | 6/2015 | Angara | A61N 1/3787 607/46 |
| 2015/0355711 A1* | 12/2015 | Rihn | G06F 3/011 340/407.2 |

FOREIGN PATENT DOCUMENTS

| | | |
|---|---|---|
| JP | 2000-140411 A | 5/2000 |
| JP | 2007-075419 A | 3/2007 |
| JP | 2014-102830 A | 6/2014 |
| JP | 2015-146831 A | 8/2015 |
| KR | 2014-0064645 A | 5/2014 |

* cited by examiner

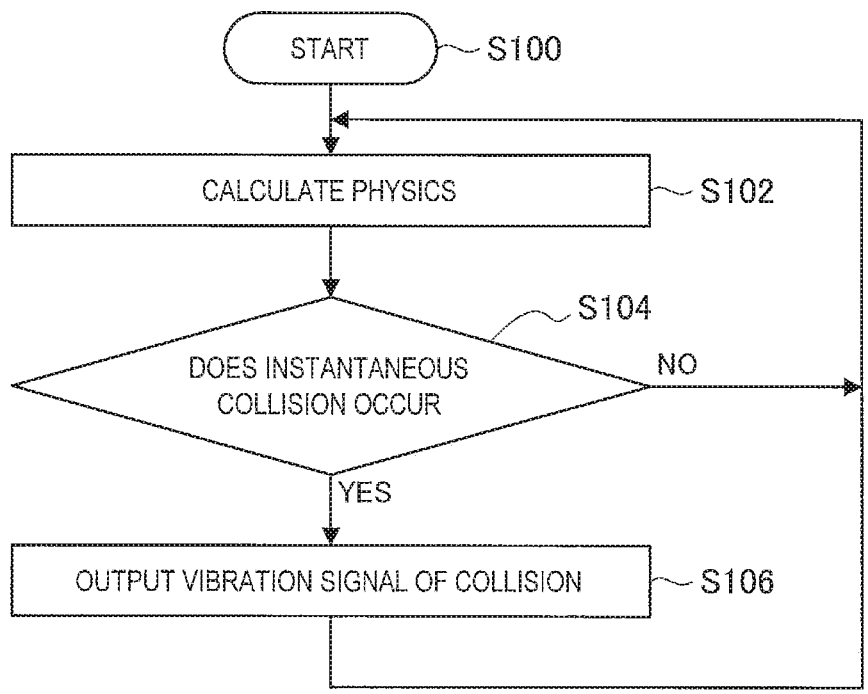
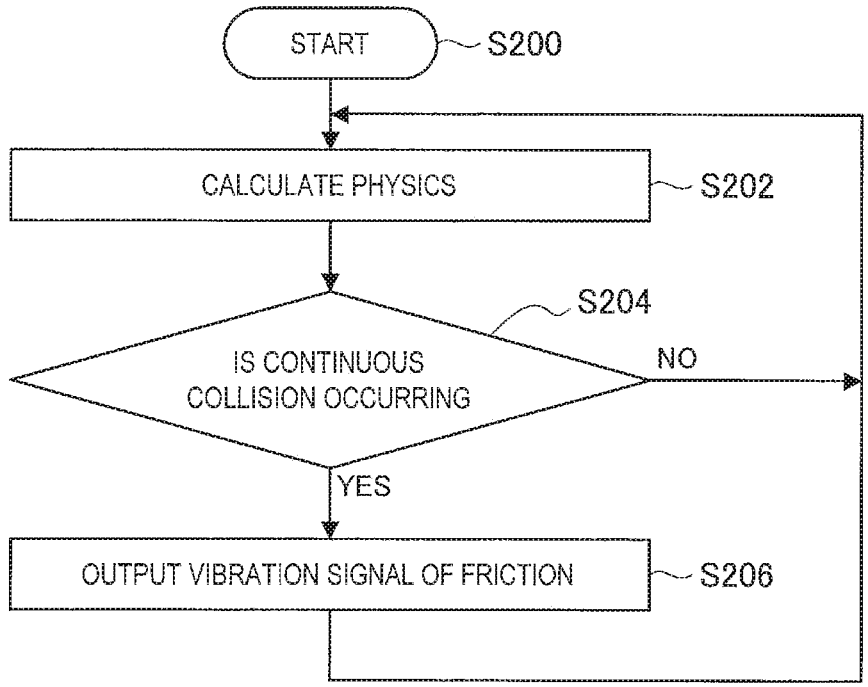

FIG. 17
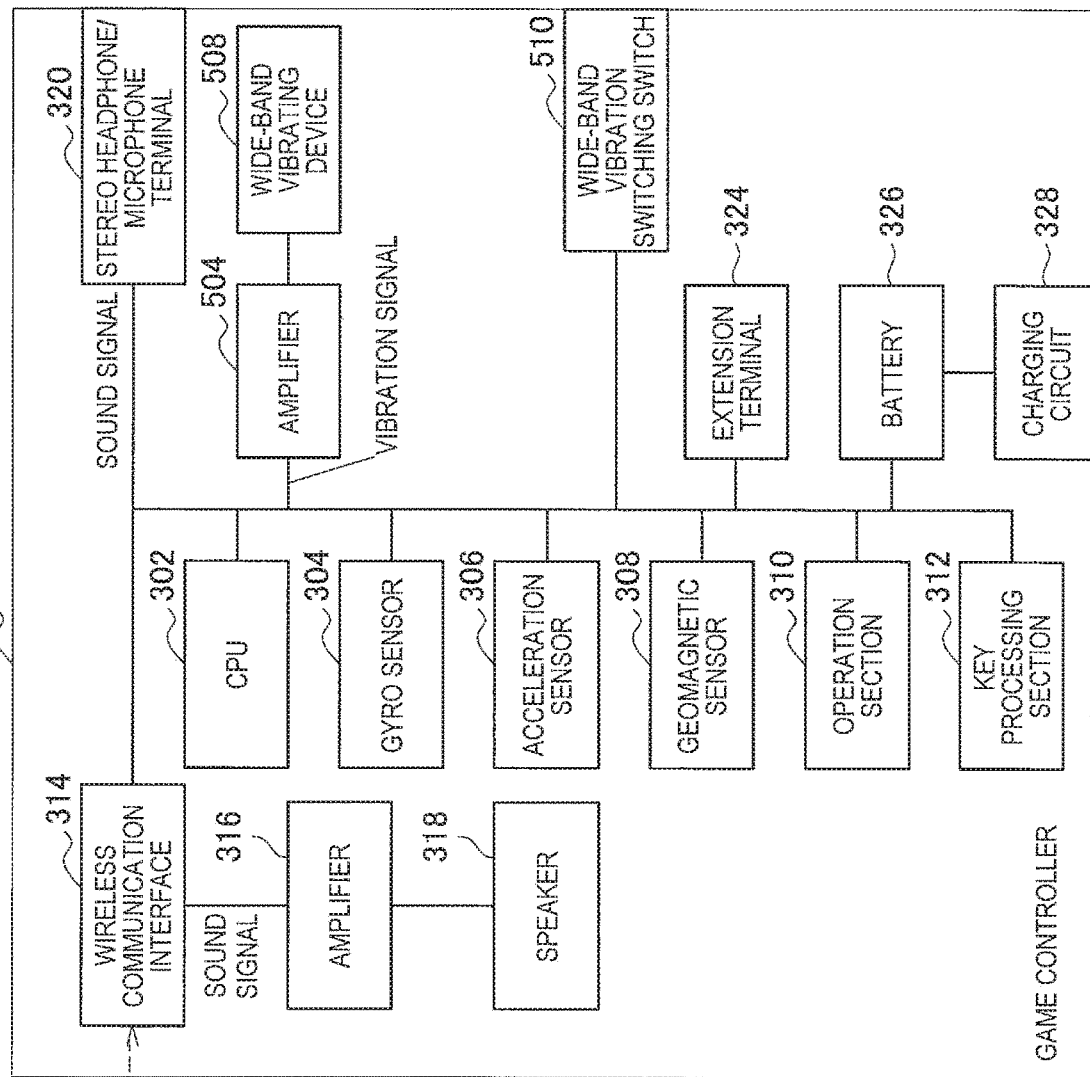
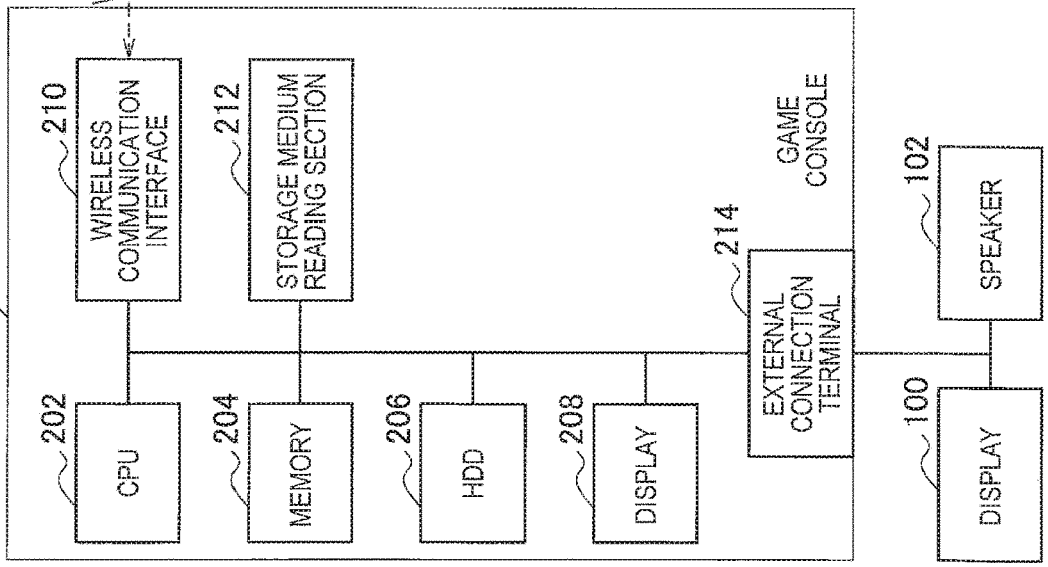

FIG. 18

| GAME SOFTWARE | | CONTROLLER | | |
|---|---|---|---|---|
| | | A<br>ONLY ECCENTRIC MOTOR | B<br>ECCENTRIC MOTOR + WIDE-BAND VIBRATING DEVICE | C<br>ONLY WIDE-BAND VIBRATING DEVICE |
| A | ONLY ECCENTRIC MOTORS | ○ | PROCESS A1 or PROCESS A2 | PROCESS B1 or PROCESS B2 or PROCESS B3 or PROCESS B4 |
| B | ECCENTRIC MOTORS + WIDE-BAND VIBRATING DEVICES | PROCESS C1 or PROCESS C2 or PROCESS C3 | ○ | PROCESS D1 or PROCESS D2 or PROCESS D3 or PROCESS D4 |
| C | ONLY WIDE-BAND VIBRATING DEVICES | PROCESS E | PROCESS F1 or PROCESS F2 | ○ |

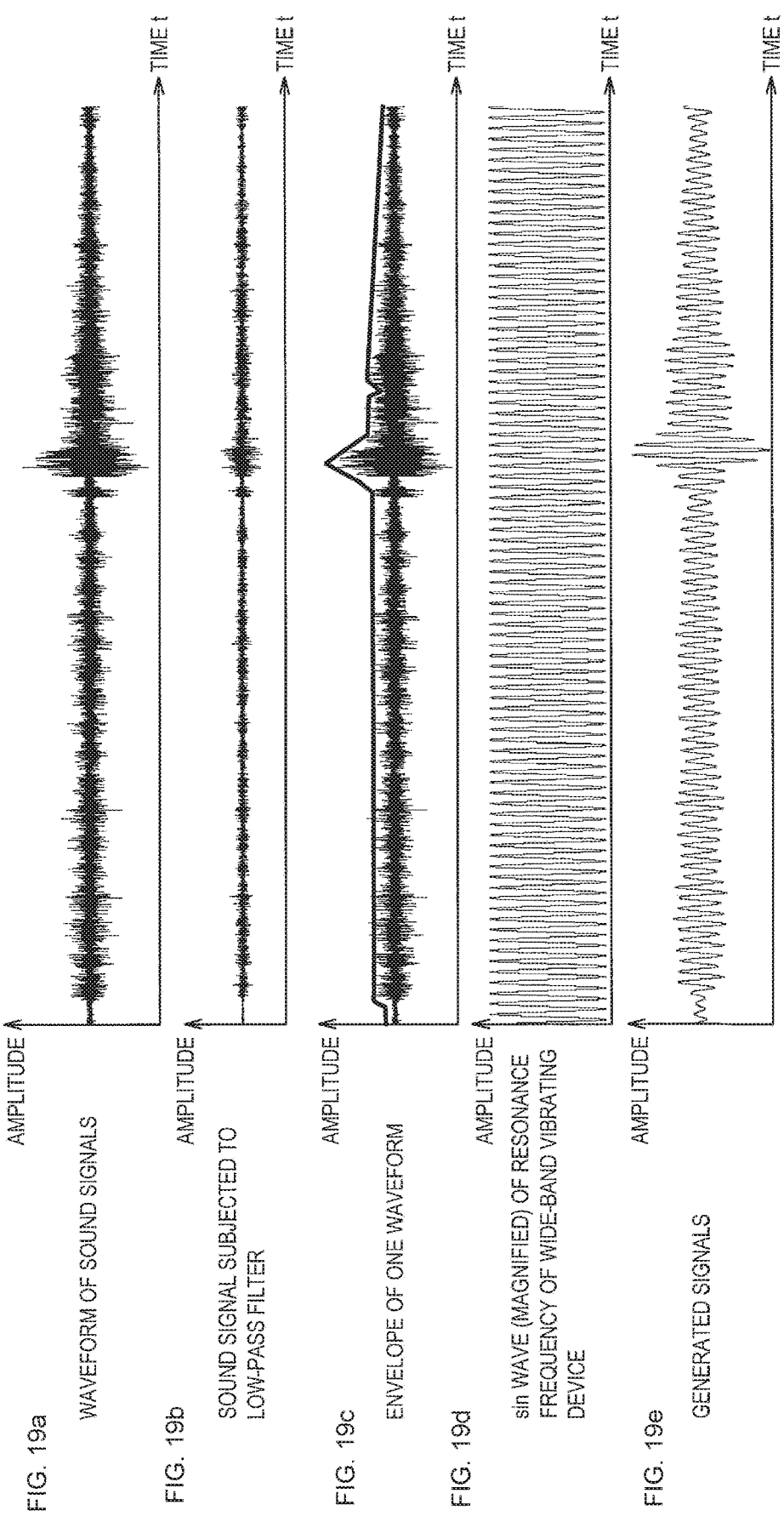

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2016/055771 filed on Feb. 26, 2016, which claims priority benefit of U.S. Provisional Patent Application No. 62/121,774 filed in the U.S. Patent and Trademark Office on Feb. 27, 2015. Each of the above-referenced applications is hereby incorporated herein by reference in its entirety.

TECHNICAL FIELD

The present disclosure relates to an information processing device, an information processing method, and an information processing system.

BACKGROUND ART

There have recently been provided game controllers that impart to users the tactile feedback corresponding to an event in a television game. The game controllers include vibrating devices such as vibrators, and users can acquire tactile feedback through the vibration of the vibrators.

Patent Literature 1 discloses a game controller that includes the above-described vibrator and is used for a television game. It is disclosed that the game controller disclosed in Patent Literature 1 includes an eccentric motor as a vibrator.

CITATION LIST

Patent Literature

Patent Literature 1: JP 2015-146831A

DISCLOSURE OF INVENTION

Technical Problem

The game controller disclosed in Patent Literature 1 includes only an eccentric motor, and the game software also supports only eccentric motors. Accordingly, tactile feedback that users can acquire is limited.

The present disclosure then proposes a novel and improved information processing apparatus in which a control section changes control on a tactile feedback apparatus on the basis of a type of tactile feedback section recognized by the control section.

Solution to Problem

According to the present disclosure, there is provided an information processing apparatus including: a control section configured to generate a control signal that controls an operation of a tactile feedback apparatus including a tactile feedback section. The control section changes control on the tactile feedback apparatus on the basis of a type of the tactile feedback section which is recognized by the control section.

Advantageous Effects of Invention

As described above, according to the present disclosure, a user can acquire the tactile feedback corresponding to a characteristic of a tactile feedback apparatus.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a flowchart illustrating a process performed when collision feedback is imparted.

FIG. 12 is a flowchart illustrating a process performed when friction feedback is imparted.

FIG. 17 is a block diagram illustrating an internal structure of a system including the game controller illustrated in FIG. 16.

FIG. 18 is a diagram illustrating a process example through a combination of game software and a game controller.

FIGS. 19a, 19b, 19c, 19d and 19e are diagrams illustrating an example of a process of generating a vibration signal for a wide-band vibrating device on the basis of a sound signal of a game.

MODE(S) FOR CARRYING OUT THE INVENTION

Figure 1:
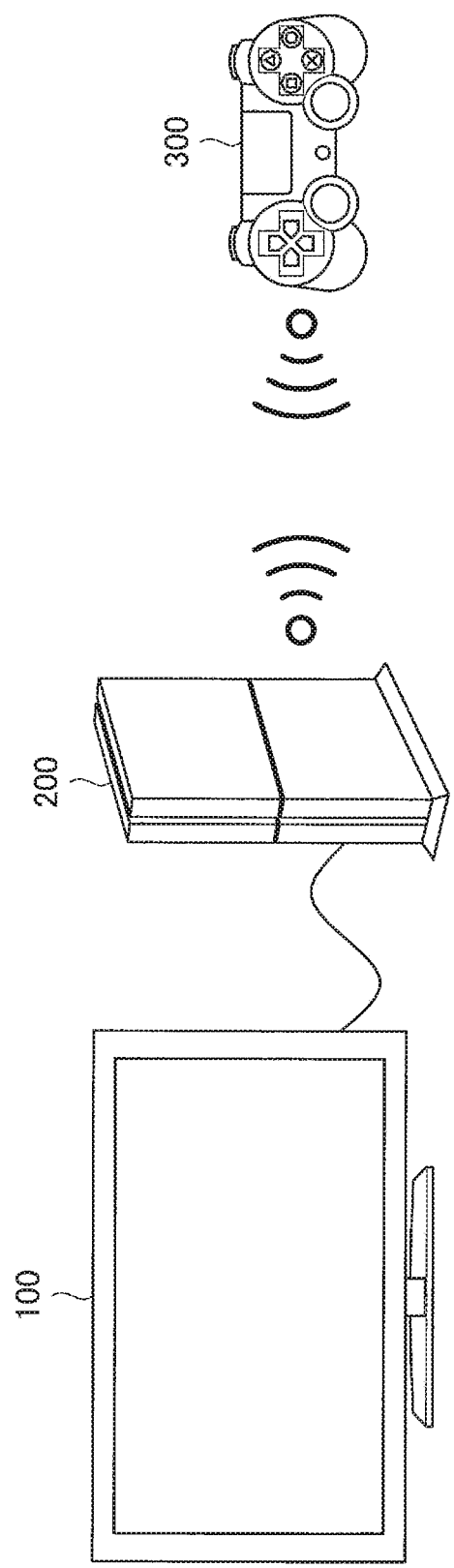
FIG. 1 is a schematic diagram illustrating a system configuration according to the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Example of System Configuration
2. Background
3. Configuration Example of External Vibrating Unit Including Wide-band Vibrating Device
4. Configuration Example of Game Controller Including Eccentric Motor and Wide-band Vibrating Device
5. Configuration Example of Game Controller Including Only Wide-band Vibrating Device
6. Operation Example of Control on Game Controller Including Different Vibrating Devices
7. Operation Example for Game Console to Switch Control
8. Operation Example in Case where Game Controller Generates Vibration Signal
9. Supplemental Information
10. Conclusion

1. Example of System Configuration

FIG. 1 is a diagram illustrating a configuration example of a system according to the present embodiment. The system according to the present embodiment includes a display 100, a game console 200, and a game controller 300. For example, the display 100 receives an image signal output from the game console 200, and displays an image of game software for which the game console 200 performs a process. Further, in a case where the display 100 includes a speaker 102, the speaker 102 outputs, on the basis of a sound signal output from the game console 200, a sound related to game software for which the game console 200 performs a process. The display 100 only has to be an apparatus that displays an image, and may be, for example, a television, a projector, or the like.

The game console 200 reads game software stored in an optical storage medium such as a Bluray Disc (BD) (registered trademark), a DVD, or a compact disc (CD), and executes a process of the game software. The game console 200 executes a process of the game software, thereby generating an image signal and a sound signal related to the game software, or a signal for the game controller 300. The game console 200 outputs the generated image signal and sound signal to the display 100, and further outputs the signal for the game controller 300 to the game controller 300. Additionally, in a case where the game console 200 is connected to the Internet, the game console 200 may execute the game software via the Internet. In that case, the game console 200 connects to a server on the Internet, and executes the game software in cooperation with the server.

The game controller 300 is an example of a tactile feedback apparatus that imparts tactile feedback to a user. The game controller 300 includes an operation section that is operated by a user. A user operates the operation section, thereby performing an operation on a game. For example, in a case where the game console 200 executes game software such as a roll-playing game, a user can move a character in the game by operating the operation section. Further, in a case where the game console 200 executes game software such as a shooting game, a user can perform an operation of firing a gun in the game by operating the operation section. Additionally, game software is an example of software programmed to generate a control signal for the tactile feedback section.

The game controller 300 is connected to the game console 200 in a wireless or wired manner. The game controller 300 transmits an operation signal to the game console 200 in accordance with operation content of a user. The game console 200, which receives the operation signal from the game controller 300, processes the operation signal and converts the operation signal into the movement of a character or the like in the game software.

Figure 2:
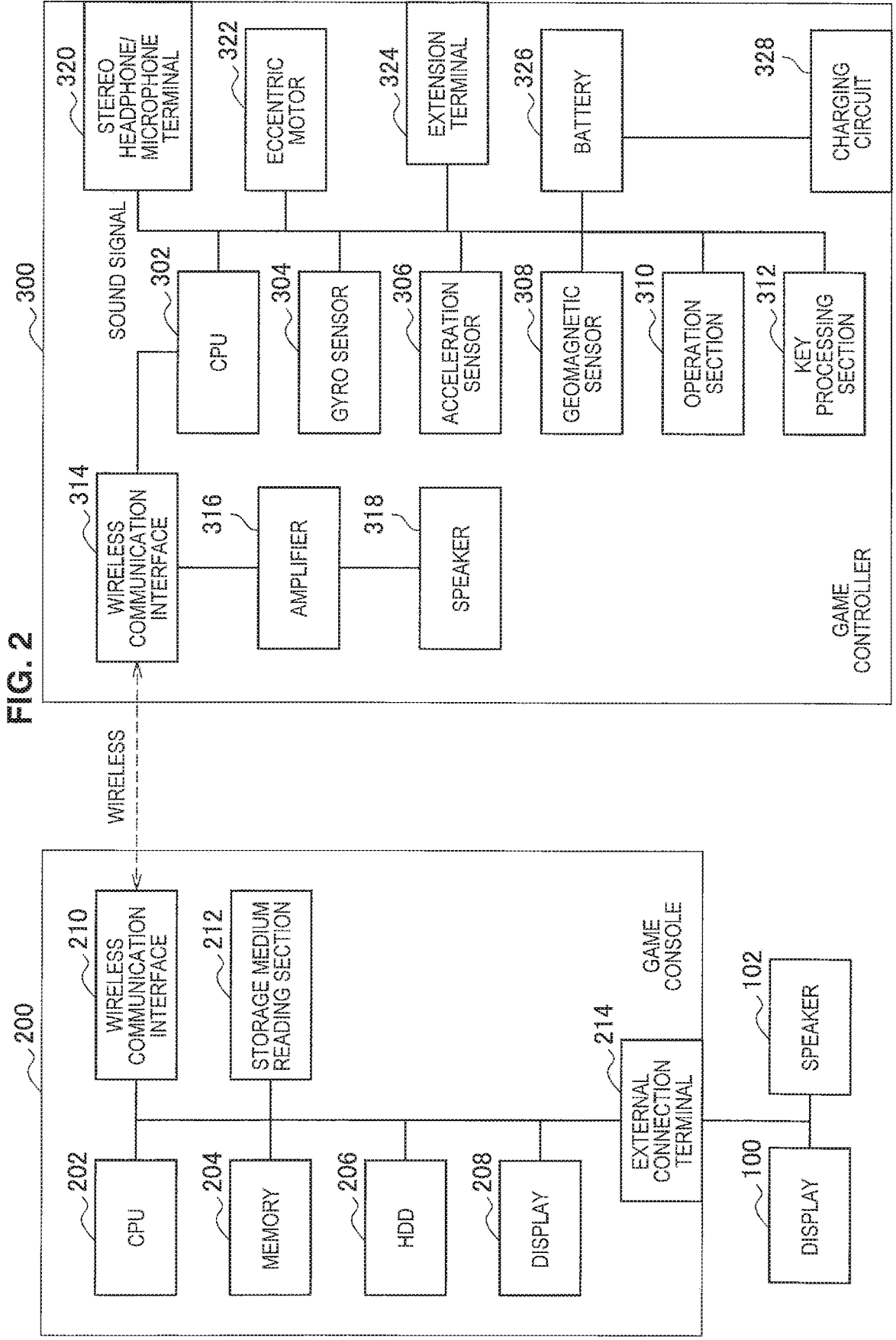
FIG. 2 is a block diagram illustrating an internal structure of the system configuration illustrated in FIG. 1.

FIG. 2 is a block diagram illustrating the configuration of the above-described game system. Here, the display 100 may include the speaker 102. The game console 200 includes a CPU 202, a memory 204, a hard disc drive (HDD) 206, a display, a wireless communication interface 210, a storage medium reading section 212, and an external connection terminal 214. The CPU 202 is an example of a control section that generates control signals for controlling the operations of the game console 200 and the game controller 300, and processes various types of information. For example, the CPU 202 processes game software read by the storage medium reading section 212 in cooperation with the memory 204 or the like. The memory 204 is a storage medium that temporarily stores data when the CPU 202 executes a process.

The HDD 206 is a storage medium that generally has a larger capacity than the capacity of the memory 204, and stores data for a long time. For example, in a case where a user downloads game software via the Internet, the HDD 206 stores the downloaded game software. Further, in a case where the game console 200 has a recording function of recording a TV program or the like, the HDD 206 stores the recorded moving image data.

The display 208 is used to display the state of the game console 200. For example, in a case where the game console 200 is powered on, the display 208 may be configured to emit light. Further, in a case where the game console 200 is powered off, the display 208 may emit different light in color from the light emitted when the game console 200 is powered on. Further, in a case where the game console 200 has an error, the display 208 may be configured to blink.

The wireless communication interface 210 is an example of a communication section that communicates with the game controller 300. The wireless communication interface 210 communicates with the game controller 300 on the basis of game software. The wireless communication interface 210 may be, for example, Bluetooth (registered trademark) or Zigbee (registered trademark).

The storage medium reading section 212 reads information stored in a storage medium such as a BD, a DVD, or a CD in which game software or the like is stored. The storage medium reading section 212 sends the read information to the CPU 202. The CPU 202 processes this information, thereby executing the game.

The external connection terminal 214 transmits an image signal and a sound signal to the display 100. The external connection terminal 214 may be, for example, a high-definition multimedia interface (HDMI) (registered trademark). The HDMI transfers a digital signal in the transition minimized differential signaling (TMDS) scheme, and transfers an apparatus control signal through the consumer electronics control (CEC). Further, the external connection terminal 214 may be a video graphics array (VGA) terminal or a universal serial bus (USB).

Next, the configuration of the game controller 300 will be described. The game controller 300 includes a CPU 302, a gyro sensor 304, an acceleration sensor 306, a geomagnetic sensor 308, an operation section 310, and a key processing section 312. Further, the game controller 300 includes a wireless communication interface 314, an amplifier, a speaker 318, a stereo headphone/microphone terminal 320, an eccentric motor 322, an extension terminal 324, a battery 326, and a charging circuit 328.

The CPU 302 is an example of a control section that generates a control signal for the game controller 300. The CPU 302 processes information received from the game console 200, and further processes information from each sensor and the key processing section 312 included in the game controller 300. The CPU 302 may be configured to, for example, process information acquired from each sensor and computes the state of the game controller 300 such as acceleration or inclination. Further, the CPU may be configured to simply transmit information acquired from each sensor to the game console 200, and the game console 200, which receives the information, may be configured to determine the state of the game controller 300.

The gyro sensor 304 detects the rotation of the game controller 300, the acceleration sensor 306 detects the acceleration of the game controller 300, and the geomagnetic sensor 308 detects the geomagnetism, thereby detecting the direction of the game controller 300.

The operation section 310 is used for operating a character or the like in a game through a user operation. The operation section 310 may include up, down, left, and right keys and buttons, or a joy stick that rotates in all the directions around the axis. The key processing section 312 processes the content of an operation on the operation section 310 by a user, and sends the information to the CPU 302.

The wireless communication interface 314 is an example of a communication section, and the wireless communication interface 314 communicates with the game console 200. The wireless communication interface 314 may receive a sound signal, for example, from the game console 200, and receive a vibration signal for operating the eccentric motor 322. Further, the wireless communication interface 314 may transmit an operation signal to the game console 200. The operation signal indicates that the operation section 310 is operated by a user.

An amplifier 316 amplifies a sound signal received by the wireless communication interface 314, and sends the amplified sound signal to the speaker 318. The speaker 318 outputs a sound on the basis of the sound signal that is received by the wireless communication interface 314 and amplified by the amplifier 316.

The stereo headphone/microphone terminal 320 is used for outputting a sound signal received by the wireless communication interface 314 to external stereo headphones. Further, the stereo headphone/microphone terminal 320 sends a sound signal input from an external microphone to the CPU 302.

The eccentric motor 322 is an example of a tactile feedback section that imparts tactile feedback to a user. The eccentric motor 322 is a vibrating device whose motor rotation shaft has a weight attached thereto. The weight is eccentric in shape. The eccentric motor 322 can impart vibration to a user by rotating. The eccentric motor 322 rotates on the basis of a vibration signal received by the wireless communication interface 314 from the game console 200 as a control signal.

The extension terminal 324 is used for connecting an external apparatus to the game controller 300. In a case where an external apparatus is connected to the game controller 300, the extension terminal 324 sends information on the external apparatus to the CPU 302. Further, the extension terminal 324 also sends information to the external apparatus. The extension terminal 324 may be an interface such as I²C. The battery 326 supplies electric power for operating each section of the game controller 300. The battery 326 is charged via the charging circuit 328.

2. Background

The above shows the general configuration of the game system according to the present embodiment. The following describes the background of the present disclosure. The recent game controller has a vibration feedback function provided from the eccentric motor 322 as described above, and can emphasize the sense of presence for a game. In such a situation, the sense of immersion is being emphasized for virtual reality experience using a head-mounted display as the resolution and the angle of visibility are increasing or the stereophony is gaining widespread use. Meanwhile, tactile feedback associated with an interaction has not yet been achieved. There is the problem that tactile awkwardness stands out as compared with visual and auditory awkwardness in a game experience.

It is not possible to freely control the drive frequency or strength of the eccentric motor 322 used for the game controller. Moreover, the eccentric motor 322 is not responsive. The eccentric motor 322 cannot problematically express a detailed vibration that, for example, allows a user to have a latch feeling, feel impact, or feel rough texture.

Further, game software is created on the condition of tactile feedback from the eccentric motor 322. Accordingly, there is the problem that the original operability is lost in a case where the vibrating device is replaced with a device having different specifications.

Further, in a case where a developer wants to express, for example, a latch feeling in accordance with an input operation through an analog stick, a button, or the like, there is the problem that delay grows before a conventional vibration control signal (vibration signal) is output and causes a user feel less direct because the conventional vibration control signal (vibration signal) is generated on the host side (game console 200 side).

Further, it is an important factor for achieving high-definition tactile feedback to link tactile feedback to not only vibration, but also a sound. The vibrating device and the speaker, however, include different parts and driving circuits. Accordingly, the delay depending on each device varies. Especially, a hand-held game controller having a limited housing size is confronted with a problem such as a limited battery capacity caused by an increasing number of parts. The inventors of the present application have then devised the present disclosure in view of the above-described circumstances.

Figure 3C:
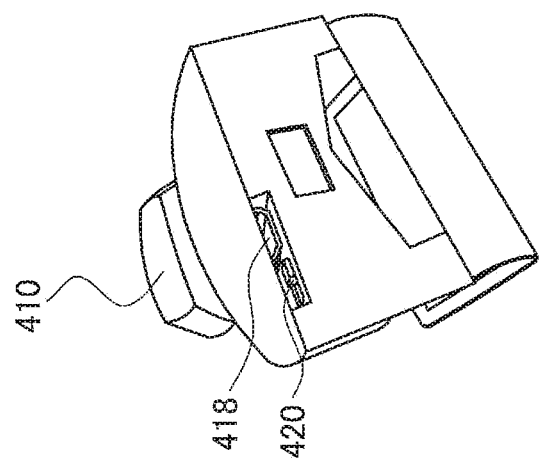
FIGS. 3a, 3b and 3c are diagrams illustrating an appearance of an external vibrating unit according to the present disclosure.
Figure 3B:
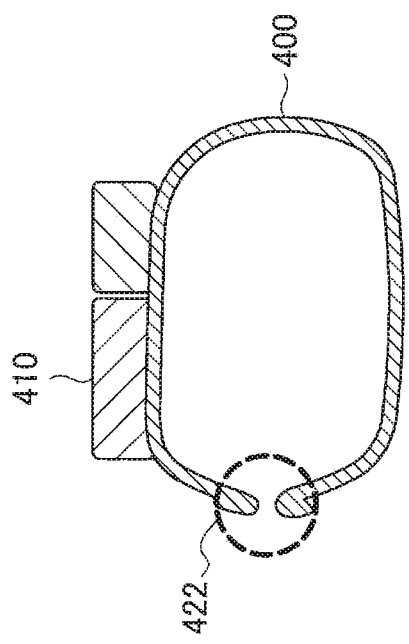
Figure 3A:
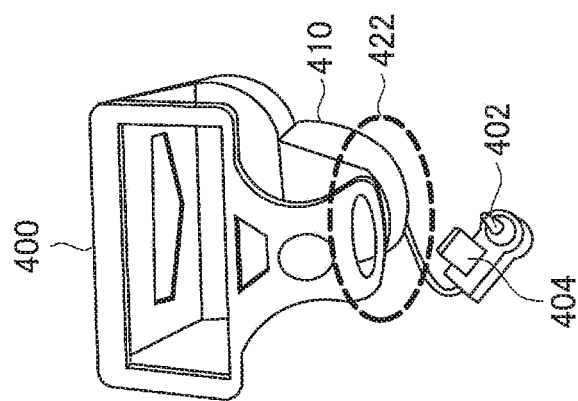

3. Configuration Example of External Vibrating Unit Including Wide-band Vibrating Device FIGS. 3a, 3b and 3c are diagrams illustrating an external vibrating unit 400 that is externally attached to the game controller 300 based on the above-described background. The "external vibrating unit 400" externally attached to the game controller 300 as illustrated in FIGS. 3a, 3b and 3c are conceivable as one of embodiments for achieving wide-band feedback to the game controller 300. The external vibrating unit 400 is an example of a second tactile feedback apparatus that imparts different tactile feedback from tactile feedback of the game controller 300. The external vibrating unit 400 includes a wide-band vibrating device such as a voice coil motor (or a piezo-actuator, an electromagnetic linear actuator, or the like) or the like. The wide-band vibrating device is an example of a tactile feedback section that imparts tactile feedback to a user. The wide-band vibrating device will be described in detail below.

Next, the shape of the external vibrating unit 400 will be described. The external vibrating unit 400 has an opening 422 provided to fit the main body of the game controller 300 as illustrated in FIGS. 3a and 3b. Further, the external vibrating unit 400 includes a vibration signal input terminal 402, and a communication terminal 404 that are connected for receiving a signal from the controller 300. Further, the external vibrating unit 400 includes a wide-band vibrating device 410 as illustrated in FIGS. 3a, 3b and 3c. Further, the external vibrating unit includes a charging connector 418 and an ON/OFF switch 420 as illustrated in FIGS. 3b and 3c.

Figure 4:
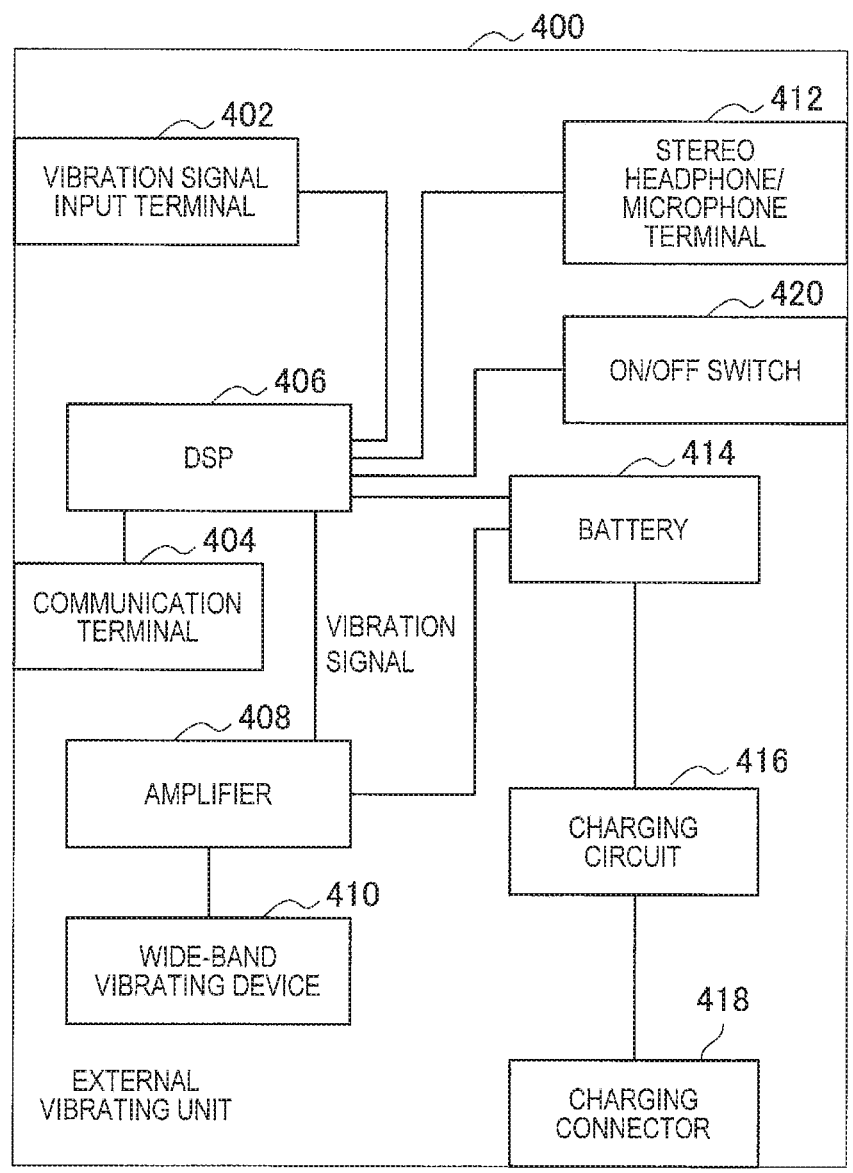
FIG. 4 is a block diagram illustrating an internal structure of the external vibrating unit according to the present disclosure.

The above describes the appearance of the external vibrating unit 400. The following describes the configuration of the external vibrating unit 400 in more detail. FIG. 4 is a block diagram illustrating the configuration of the external vibrating unit 400. The external vibrating unit 400 includes the vibration signal input terminal 402, the communication terminal 404, a digital signal processor (DSP) 406, an amplifier 408, the wide-band vibrating device 410, a stereo headphone/microphone terminal 412, a battery 414, a charging circuit 416, the charging connector 418, and the ON/OFF switch 420.

The vibration signal input terminal 402 is connected to the stereo headphone/microphone terminal 320 of the game controller 300. A vibration input terminal receives, from the stereo headphone/microphone terminal 320 of the game controller 300, a sound signal wirelessly transferred from the game console 200 to the game controller 300.

The communication terminal 404 is connected to the extension terminal 324 of the game controller 300. The communication terminal 404 is connected to the extension terminal 324 of the game controller 300, and the game console 200 hereby recognizes automatically that the external vibrating unit 400 is connected to the game controller 300 and the game console 200. This eliminates the necessity for a user to perform an operation such as changing the setting in a game.

The charging circuit 416 is supplied with electric power from the game controller 300 through the charging connector 418, and used for charging the battery 414. The charged battery 414 is used for driving the external vibrating unit 400. Additionally, the external vibrating unit 400 does not have to include the battery 414, but may be configured to operate by being supplied with electric power from the game controller 300.

The stereo headphone/microphone terminal 412 is used for outputting sound signals to external stereo headphones. Further, the stereo headphone/microphone terminal 412 is used for inputting a sound signal input from an external microphone to the CPU 302. In a case where the external vibrating unit 400 is connected to the game controller 300, the vibration signal input terminal 402 of the external vibrating unit 400 is connected to the stereo headphone/microphone terminal 320 of the game controller 300. Accordingly, the stereo headphone/microphone terminal 320 of the game controller 300 is unavailable. That is, headphones or microphones typically used to listen to game sounds or chat cannot be connected to the game controller 300. The stereo headphone/microphone terminal 412 may be then provided to the external vibrating unit 400, thereby allowing headphones and a microphone to connect.

The amplifier 408 amplifies a sound signal input from the vibration signal input terminal 402. The sound signal amplified by the amplifier is then applied to the wide-band vibrating device 410. That is, the wide-band vibrating device 410 vibrates using a vibration signal based on a sound signal. The DSP 406 performs a process of filtering a sound signal, a process of separating a sound signal from a vibration signal, or the like. The DSP 406 may have functions of AD conversion and DA conversion.

The wide-band vibrating device 410 includes a voice coil motor (or a piezo-actuator, an electromagnetic linear actuator, or the like) or the like as described above. The wide-band vibrating device 410 can control vibration in more detail than the above-described eccentric motor 322 of the game controller 300. The ON/OFF switch 420 is used for switching the operation of the external vibrating unit 400 on or off.

Figure 7:
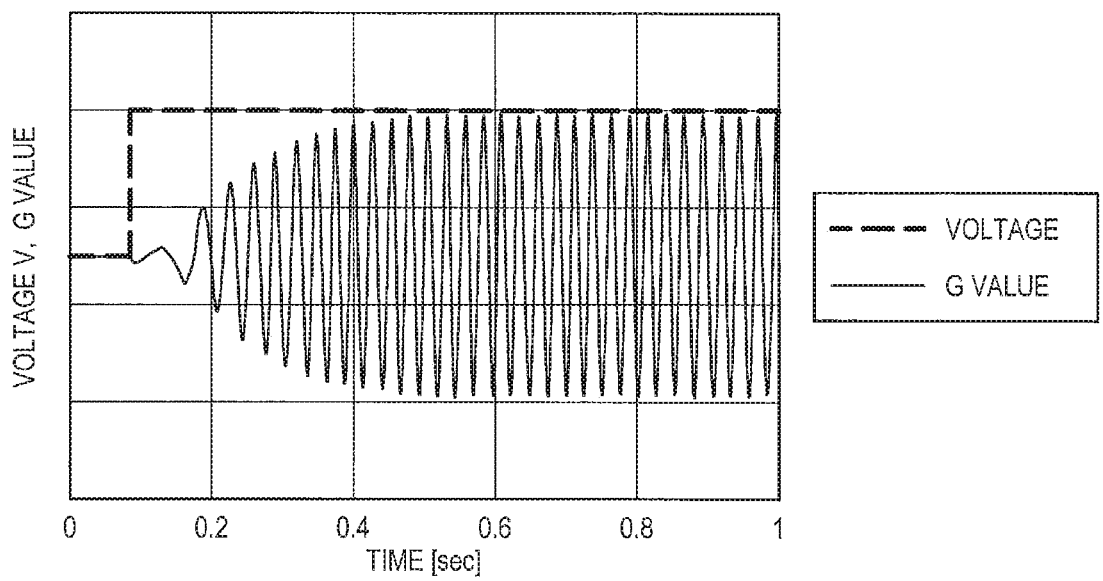
FIG. 7 is a diagram illustrating a vibration characteristic of an eccentric motor.

Here, the vibration characteristics of the eccentric motor 322 and the wide-band vibrating device 410 will be described with reference to FIGS. 7 and 8. FIG. 7 is a diagram illustrating voltage applied to the eccentric motor 322 and vibration acceleration (G value). The eccentric motor 322 is driven by DC voltage. The eccentric motor 322 converges at vibration having a fixed amplitude and frequency a predetermined time after voltage is applied. As illustrated in FIG. 7, the eccentric motor 322 vibrates with the amplitude corresponding to the frequency of the vibration one to one.

Figure 8:
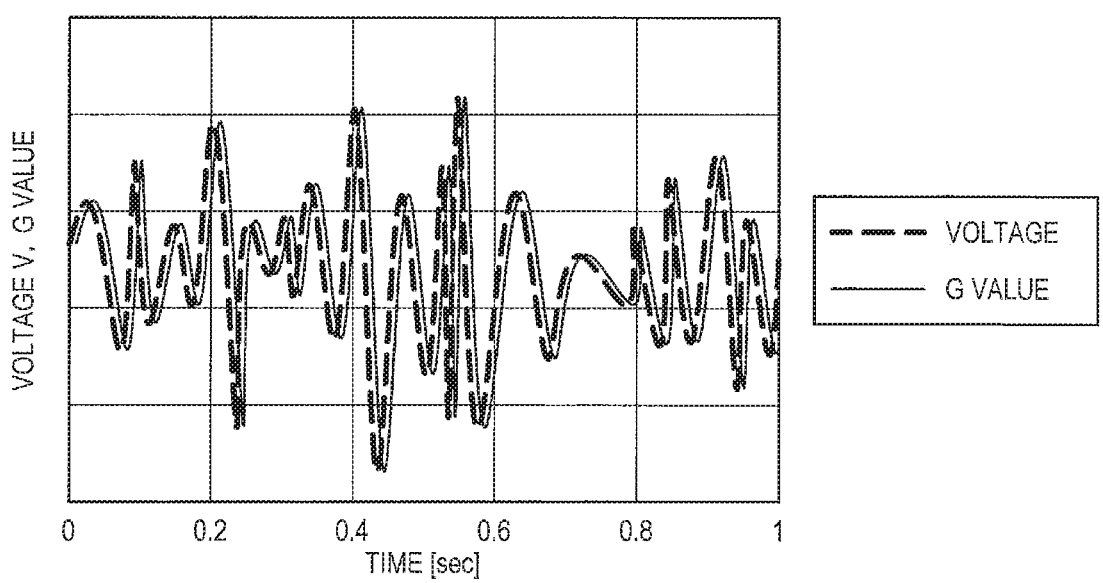
FIG. 8 is a diagram illustrating a vibration characteristic of a wide-band vibrating device.

FIG. 8 is a diagram illustrating voltage applied to the wide-band vibrating device 410 and vibration acceleration. The wide-band vibrating device 410 is driven by not DC voltage, but analog signals such as sound signals that change in magnitude and polarity over time. Further, the wide-band vibrating device 410 vibrates with the amplitude independent from the frequency of the vibration. As illustrated in FIG. 8, the wide-band vibrating device 410 generates the acceleration substantially corresponding to the applied voltage waveform slightly after the applied voltage. Accordingly, it is possible to express more detailed vibration.

As described above, the eccentric motor 322 cannot independently control the amplitude and frequency of the vibration. Meanwhile, the wide-band vibrating device 410 can independently control the amplitude and frequency of the vibration. Further, the eccentric motor 322 is less responsive than the wide-band vibrating device 410. Further, applying the voltage waveform illustrated in FIG. 7 allows the wide-band vibrating device 410 to express the vibration that simulates the vibration of the eccentric motor 322.

Meanwhile, the eccentric motor 322 characteristically has greater maximum generation vibration acceleration per volume than that of the wide-band vibrating device 410.

Figure 5A:
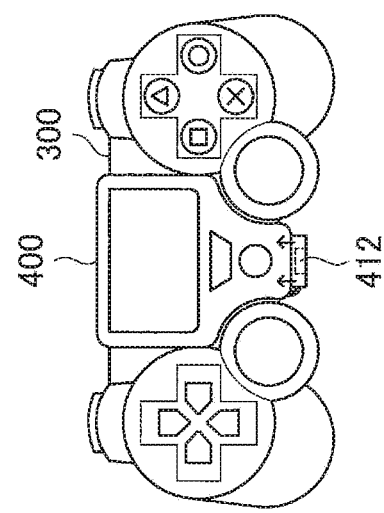
FIGS. 5A(a), 5A(b) and 5A(c) are diagrams illustrating a method of attaching the external vibrating unit according to the present disclosure to a game controller.
Figure 5A:
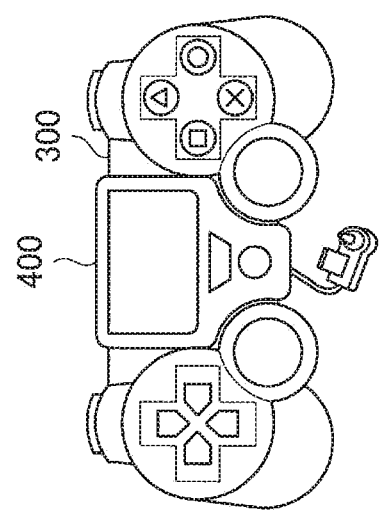
Figure 5A:
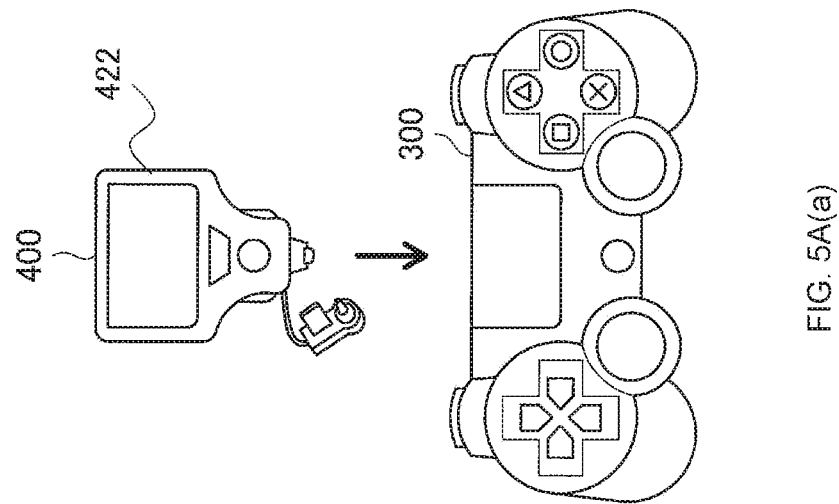

The above describes the configuration of the external vibrating unit 400. The following describes a method of attaching the external vibrating unit 400 to the controller 300. FIGS. 5A(a), 5A(b) and 5A(c) are diagrams illustrating a method of attaching the external vibrating unit 400. First, the shape of the game controller 300 will be described. The game controller 300 is designed to be held by both hands of a user. The game controller 300 includes grip sections on both sides. The grip sections are shaped to be held by the hands of a user. Additionally, the eccentric motors 322 may be disposed in the both grip sections.

Operation keys are disposed on both grip sections. Up, down, left, and right keys are disposed on the left grip section, and four operation buttons are disposed on the right grip section. Further, joy sticks are disposed at the lower right of the up, down, left, and right keys and the lower left of the operation buttons.

Further, a quadrangular touch pad is disposed on the main body between both grip sections. The speaker 318 is disposed under the touch pad. Further, the stereo headphone/microphone terminal 320 and the extension terminal 324 are disposed between the two joy sticks of the main body.

The external vibrating unit 400 includes a flexible material such as plastics. As illustrated in FIG. 5A(a), if the opening 422 of the external vibrating unit 400 is inserted from the upper part of the game controller 300, the opening 422 of the external vibrating unit 400 is temporarily enlarged by bending.

The opening 422 of the external vibrating unit 400 is then fastened under the main body of the game controller 300 to grasp the main body of the game controller 300 as illustrated in FIG. 5A(b). This fixes the external vibrating unit 400 to the game controller 300. The external vibrating unit 400 may then have the opening 422 for the touch pad in order to prevent the external vibrating unit 400 from hiding the touch pad of the game controller 300 as illustrated in FIGS. 5A(a), 5A(b) and 5A(c). Finally, as illustrated in FIG. 5A(c), the vibration signal input terminal 402 and the communication terminal 404 of the external vibrating unit 400 are connected to the game controller 300.

If the above-described configuration is expressed in other words, the external vibrating unit 400 has the opening 422 that can be fastened at the corresponding lower part of the game controller 300 by a latch and the external vibrating unit 400 can be attached to the game controller 300 using this opening 422.

Additionally, it is desirable to rigidly fix the external vibrating unit 400 to the game controller 300 with no space or gap to sufficiently transmit the vibration generated by the external vibrating unit 400 to the game controller 300.

Figure 5B:
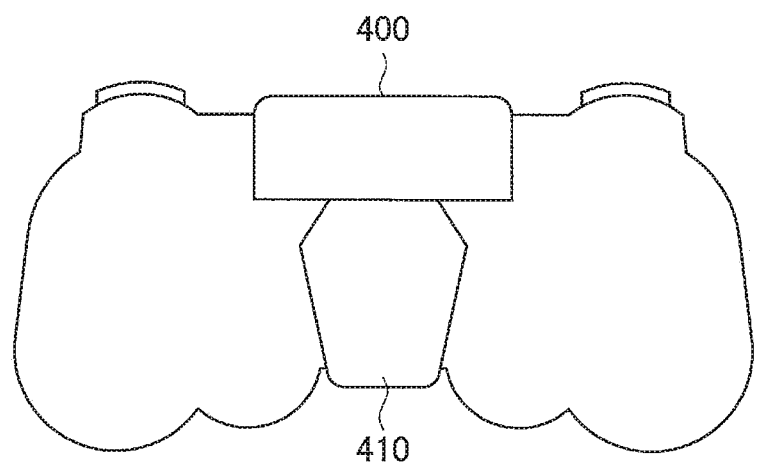
FIG. 5B is a diagram illustrating a back of the game controller to which the external vibrating unit according to the present disclosure is attached.

Further, in a case where the external vibrating unit 400 includes the single wide-band vibrating device 410, it is desirable to dispose the wide-band vibrating device 410 at the center of the game controller 300 in the horizontal direction as illustrated in FIG. 5B. The wide-band vibrating device 410 is disposed in this way because it is desirable to uniformly transmit vibration to the left and right grip sections grasped by a user. Further, it is similarly desirable to dispose the wide-band vibrating device 410 at the position near the grip sections of the game controller 300 to sufficiently transmit vibration to the hands of a user.

Figure 9:
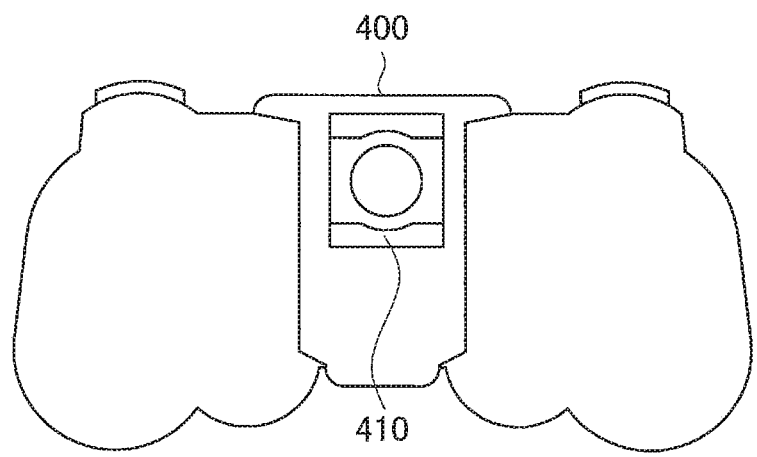
FIG. 9 is a diagram illustrating another method of attaching the external vibrating unit according to the present disclosure.
Figure 10:
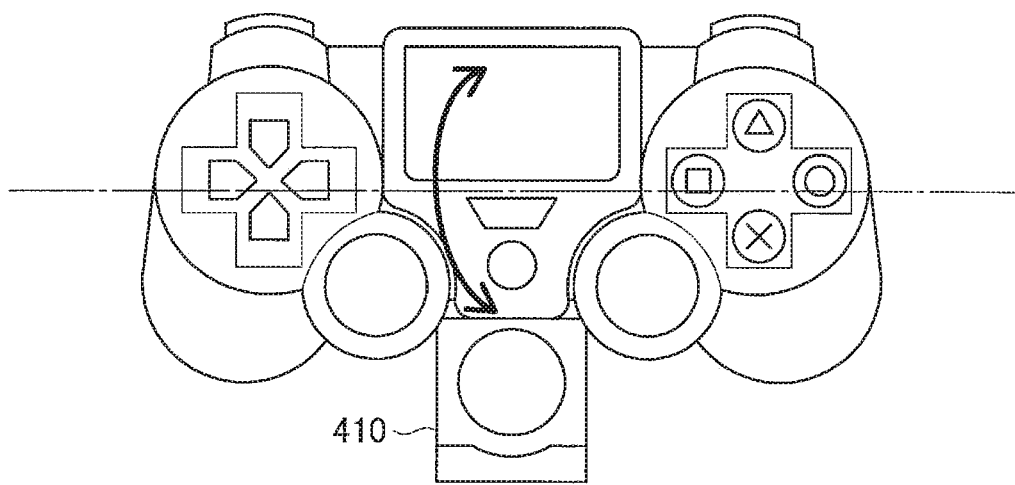
FIG. 10 is a diagram illustrating another method of attaching the external vibrating unit according to the present disclosure.

The wide-band vibrating device 410 may be disposed at the upper part of the back of the game controller 300 as illustrated in FIG. 9, or at the lower part of the game controller 300 as illustrated in FIG. 10. Further, the wide-band vibrating device 410 may be disposed in the space between the left and right grip sections which is far from the center-of-gravity position of the game controller 300 as illustrated in FIG. 10. Here, the dashed line in FIG. 10 represents the center-of-gravity position of the game controller 300. As illustrated in FIG. 10, the wide-band vibrating device 410 is disposed at the position far from the center-of-gravity position of the game controller 300, thereby offering a large moment. Accordingly, vibration is efficiently transmitted to the hands of a user.

As described above, the vibration signal input terminal 402 and the communication terminal 404 of the external vibrating device 400 are connected to the game controller 300. The arrows illustrated in FIG. 5A(c) indicate that the vibration signal input terminal 402 and the communication terminal 404 are connected to the game controller 300. Further, the external vibrating device 400 includes the stereo headphone/microphone terminal 412 as illustrated in FIG. 5A(c). External headphones or microphone is connected to the stereo headphone/microphone terminal 412.

Figure 6:
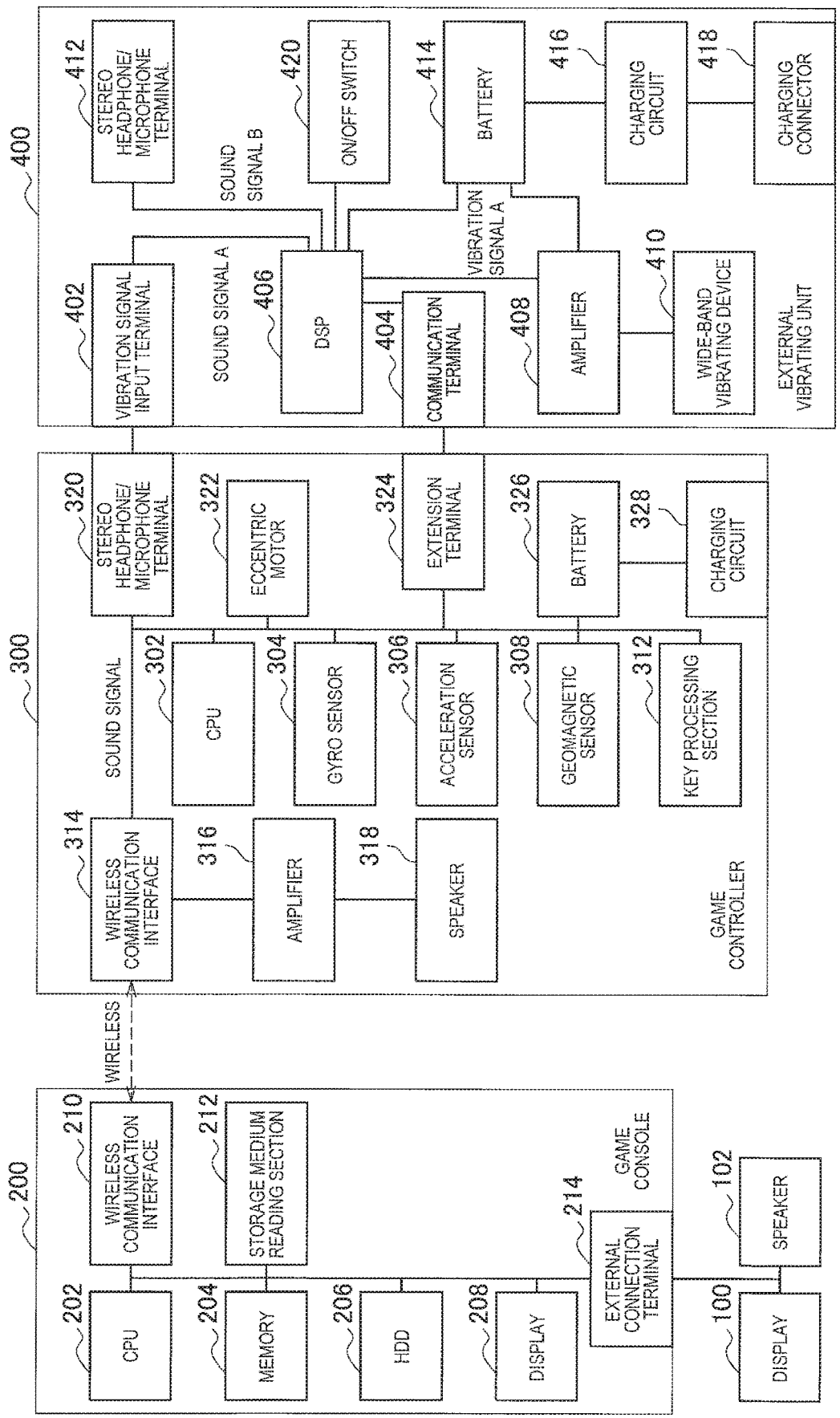
FIG. 6 is a block diagram illustrating the internal structure of the system configuration according to the present disclosure.

FIG. 6 is a block diagram illustrating the system configuration including the game console 200, the game controller 300, and the external vibrating unit 400. The game console 200 is wirelessly connected to the game controller 300 by the wireless communication interfaces 210 and 314. Wireless signals transmitted and received between the game console 200 and the game controller 300 include operation signals for the operation keys or joy sticks of the game controller 300 or the touch pad as signals sent from the game controller 300 to the game console 200. Further, wireless signals sent from the game controller 300 to the game console 200 include signals of a microphone connected to the game controller 300 or the external vibrating unit 400, or connection information of the stereo headphone/microphone terminal 320.

Further, signals sent from the game controller 300 to the game console 200 may include signals indicating the presence or absence of the connection of the external vibrating unit 400. The connected or non-connected state of the external vibrating unit 400 is determined on the basis of information acquired by the game controller 300 via the extension terminal 324. Further, the connected or non-connected state of the external vibrating unit 400 may be determined on the basis of signals acquired via the stereo headphone/microphone terminal 320.

Next, wireless signals between the game console 200 and the game controller 300 include vibration signals for driving the eccentric motor 322 in the game controller 300, and sound signals for driving the speaker 318 as signals sent from the game console 200 to the game controller 300. Further, signals sent from the game console 200 to the game controller 300 include sound signals for driving headphones or the like connected to the game controller 300. These sound signals may include vibration signals for the external vibrating unit 400.

The game controller 300 is then connected to the external vibrating unit 400 by the stereo headphone/microphone terminal 320 and the vibration signal input terminal 402, and the extension terminal 324 and the communication terminal 404. Signals transmitted and received between the game controller 300 and the external vibrating unit 400 via the connection between the stereo headphone/microphone terminal 320 and the vibration signal input terminal 402 include sound signals A as signals sent from the game controller 300 to the external vibrating unit 400.

The sound signal A is input from the vibration signal input terminal 402, and separated into a sound signal B and a vibration signal A by the DSP 406. The sound signal B is a sound signal of game software, and sent to the stereo headphone/microphone terminal 412. Meanwhile, the vibration signal A is a signal for driving the wide-band vibrating device 410. The vibration signal A is amplified by the amplifier 408, and then applied to the wide-band vibrating device 410. Additionally, the external vibrating unit 400 may be configured to receive the sound signal A from the extension terminal 324 via the communication terminal 404, and the DSP 406 may be configured to separate the vibration signal A for driving the wide-band vibrating device 410. Further, a vibration signal may be sent to the external vibrating unit 400 via the extension terminal separately from a sound signal, and the wide-band device 410 of the external vibrating unit 400 may be vibrated using this vibration signal.

The above description presupposes that signals are separated in the external vibrating unit 400. The sound signal A may be, however, separated into the sound signal B and the vibration signal A through a process in the game controller 300, and these may be allocated to L and R of a stereo signal, and then sent to the external vibrating unit 400. Such a configuration allows the vibrating device to be driven, and allows the headphones connected to the external vibrating unit 400 to be driven. Alternatively, a sound signal and a vibration signal are superimposed and sent to L and R of the sound signal A, thereby making it possible to drive the vibrating device even if the game controller 300 and the external vibrating unit 400 do not perform a signal separation process.

Additionally, in a case where external headphones or the like are connected to the stereo headphone/microphone terminal 320 of the game controller 300, the game console 200 recognizes this connection. In a case where the game console 200 recognizes the connection of the headphones or the like to the game controller 300, the game console 200 generally changes the mode to prevent the speaker of a TV or the like connected to the game console 200 from outputting a sound. The external vibrating unit 400 according to the present disclosure is, however, a device for outputting vibration. Accordingly, it is desirable to continue outputting sounds from the TV even if the vibration signal input terminal 402 is connected to the stereo headphone/microphone terminal 320 of the game controller 300.

Then, in a case where the game controller 300 detects that the external vibrating unit 400 is connected to the game controller 300, this information may be sent to the game console 200. On the basis of this information, the game console 200 may then switch the mode to a mode in which sound signals are transmitted to the game controller 300, and sounds are output to a TV or the like at the same time. Additionally, in a case where the stereo headphone/microphone terminal 412 of the external vibrating unit 400 has an external connection, the game console 200 may switch the mode to a mode in which no sound is output to the speaker of a TV or the like.

(Process Examples of Collision and Friction Feedback)

The above describes the configuration example of the system using the external vibrating unit 400. The following describes a process example of the game console 200 in a case where the external vibrating unit 400 including the wide-band vibrating device 410 is connected to the game controller 300.

FIG. 11 is a flowchart illustrating a process example of the game console 200 when a collision event occurs in a game. A process starts in S100, and the CPU 202 of the game console 200 then calculates physics in S102. Next, in S104, the CPU 202 determines on the basis of the physics calculated in S102 whether an instantaneous collision occurs in a game.

If the CPU 202 determines in S104 that no collision occurs, the process returns to S102. If the CPU 202 determines in S104 that a collision occurs, the process proceeds to S106. The CPU 202 then outputs a vibration signal of the collision. The vibration signal output here may include both a vibration signal for the eccentric motor 322 and a vibration signal for the wide-band vibrating device 410.

Next, a process example of the game console 200 when friction feedback is imparted will be described. FIG. 12 is a flowchart illustrating a process example when a friction event occurs in a game. A process starts in S200, and the CPU 202 of the game console 200 then calculates physics in S202. Next, in S204, the CPU 202 determines on the basis of the physics calculated in S202 whether a continuous collision is occurring in a game.

If the CPU 202 determines in S104 that no continuous collision is occurring, the process returns to S202. If the CPU 202 determines in S204 that a continuous collision is occurring, the process proceeds to S206. The CPU 202 then outputs a vibration signal of the friction in S206. The vibration signal output here may include both a vibration signal for the eccentric motor 322 and a vibration signal for the wide-band vibrating device 410.

The above describes the configuration example in which the external vibrating unit 400 including the wide-band vibrating device 410 is attached to the game controller 300. Such a configuration makes it possible to impart to a user detailed tactile feedback that cannot be expressed by the eccentric motor 322 alone. Further, an external vibrating unit is connected to the game controller 300. Accordingly, detailed tactile feedback is expressed using the game controller 300 including only the eccentric motor 322. Additionally, the position, attachment method, configuration, or the like of each component of the game controller 300 and the external vibrating unit 400 is not limited to the configurations illustrated in FIGS. 3a, 3b, 3c, 4, 5A(a), 5A(b), 5A(c), 5B, 6, 7, 8, 9 and 10. Further, in a case where the external vibrating unit 400 is connected to the game controller 300, a process may be performed to prevent the eccentric motor from being driven in order to save electric power.

4. Configuration Example of Game Controller Including Eccentric Motor and Wide-Band Vibrating Device The above describes the example in which the external vibrating unit 400 including the wide-band vibrating device 410 is connected to the game controller 300. The following describes a configuration example of a game controller including an eccentric motor and a wide-band vibrating device.

Figure 14:
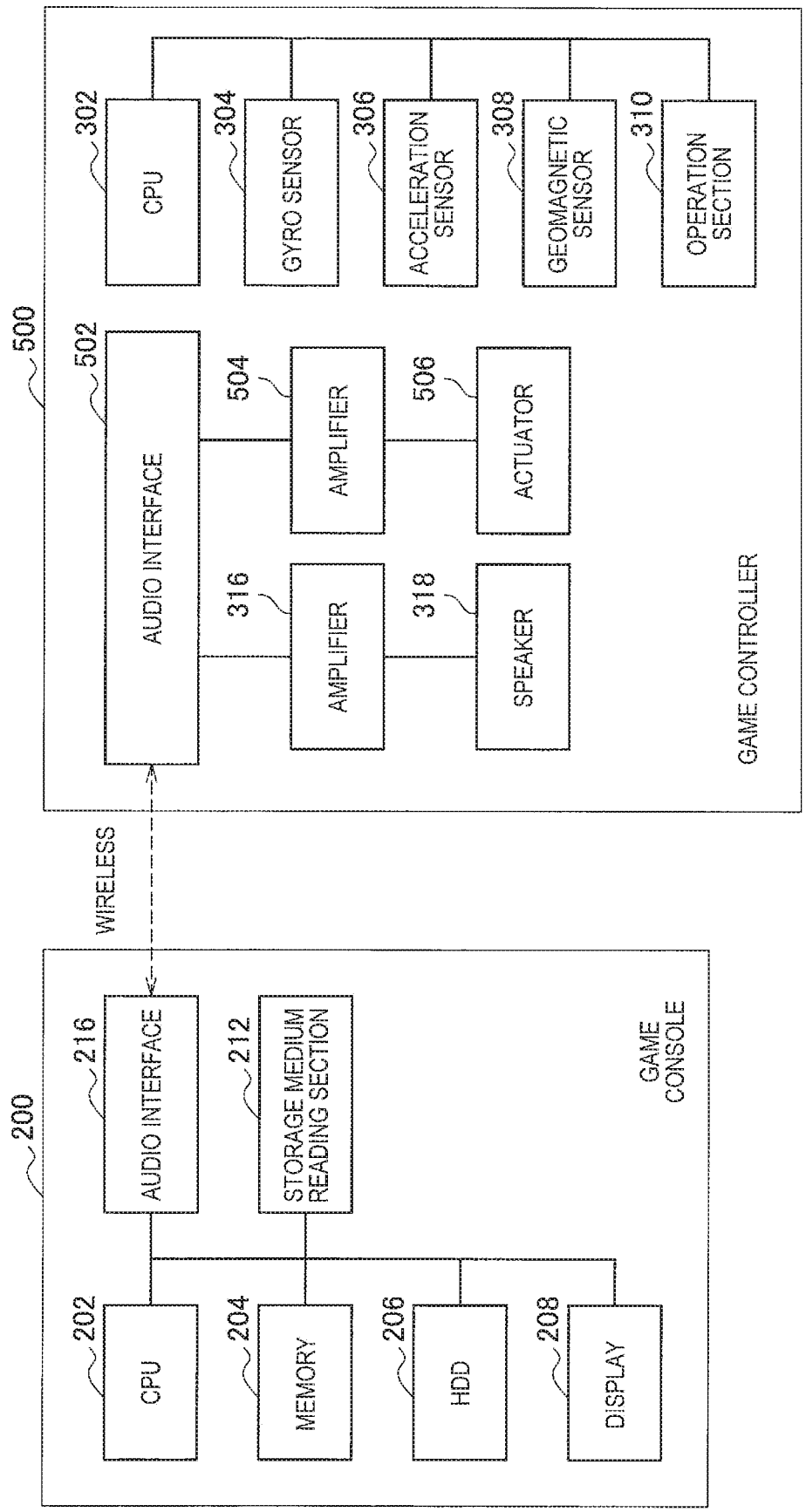
FIG. 14 is a block diagram illustrating an internal structure of a system including the game controller illustrated in FIG. 13.

It is conceivable as another embodiment for imparting wide-band vibration feedback to a game controller that a game controller 500 includes both the eccentric motor 322 and a wide-band vibrating device 508 therein as illustrated in FIG. 14. The type of vibrating device is similar to that of the above-described example.

Case (1) where the eccentric motor 322 and the wide-band vibrating device 508 are included together in each of the left and right grip sections is conceivable as a pattern of a case where the eccentric motor 322 and the wide-band vibrating device 508 are both used. Further, case (2) where the eccentric motors 322 are included in the left and right grip sections, and the wide-band vibrating devices 508 are included at different positions (e.g., positions near the center of the game controller 500) is conceivable as a pattern of a case where the eccentric motor 322 and the wide-band vibrating device 508 are both used. Further, case (3) where the eccentric motor 322 is included in one of the left and right grip sections, and the wide-band vibrating device 508 is included in the other of the left and right grip sections is conceivable as a pattern of a case where the eccentric motor 322 and the wide-band vibrating device 508 are both used.

Figure 13:
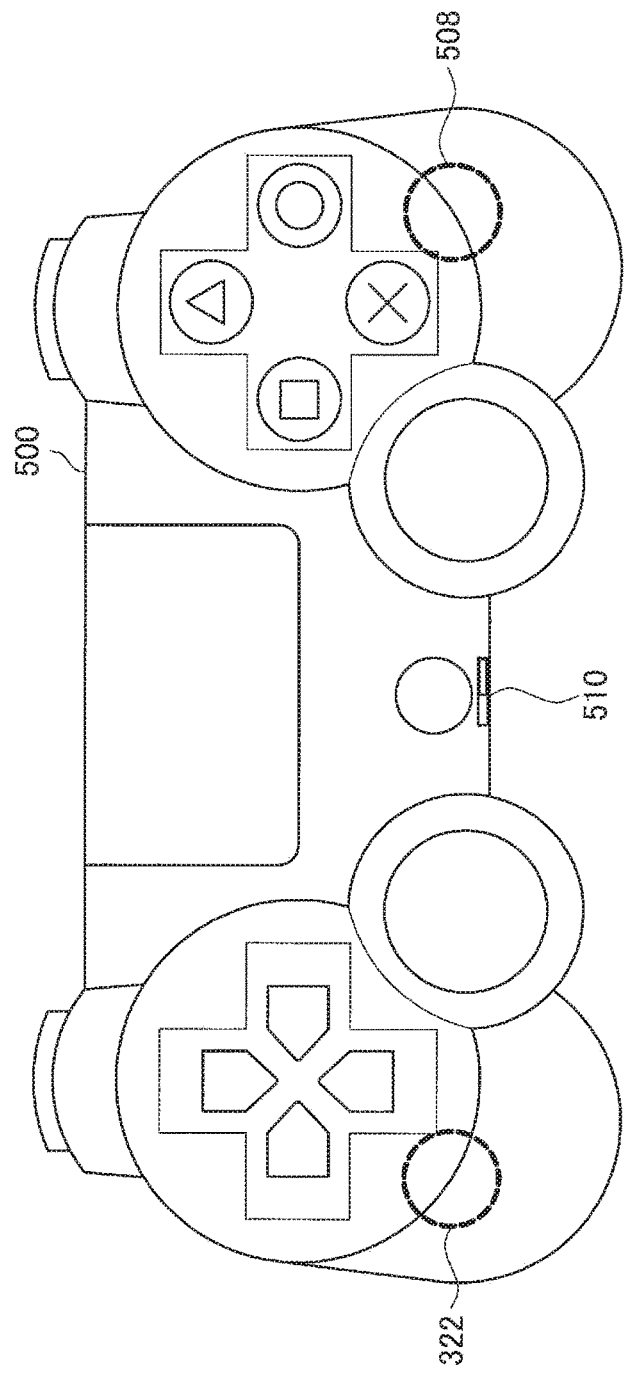
FIG. 13 is a diagram illustrating an example of a disposition position of each device in a game controller including an eccentric motor and a wide-band vibrating device.
Figure 15:
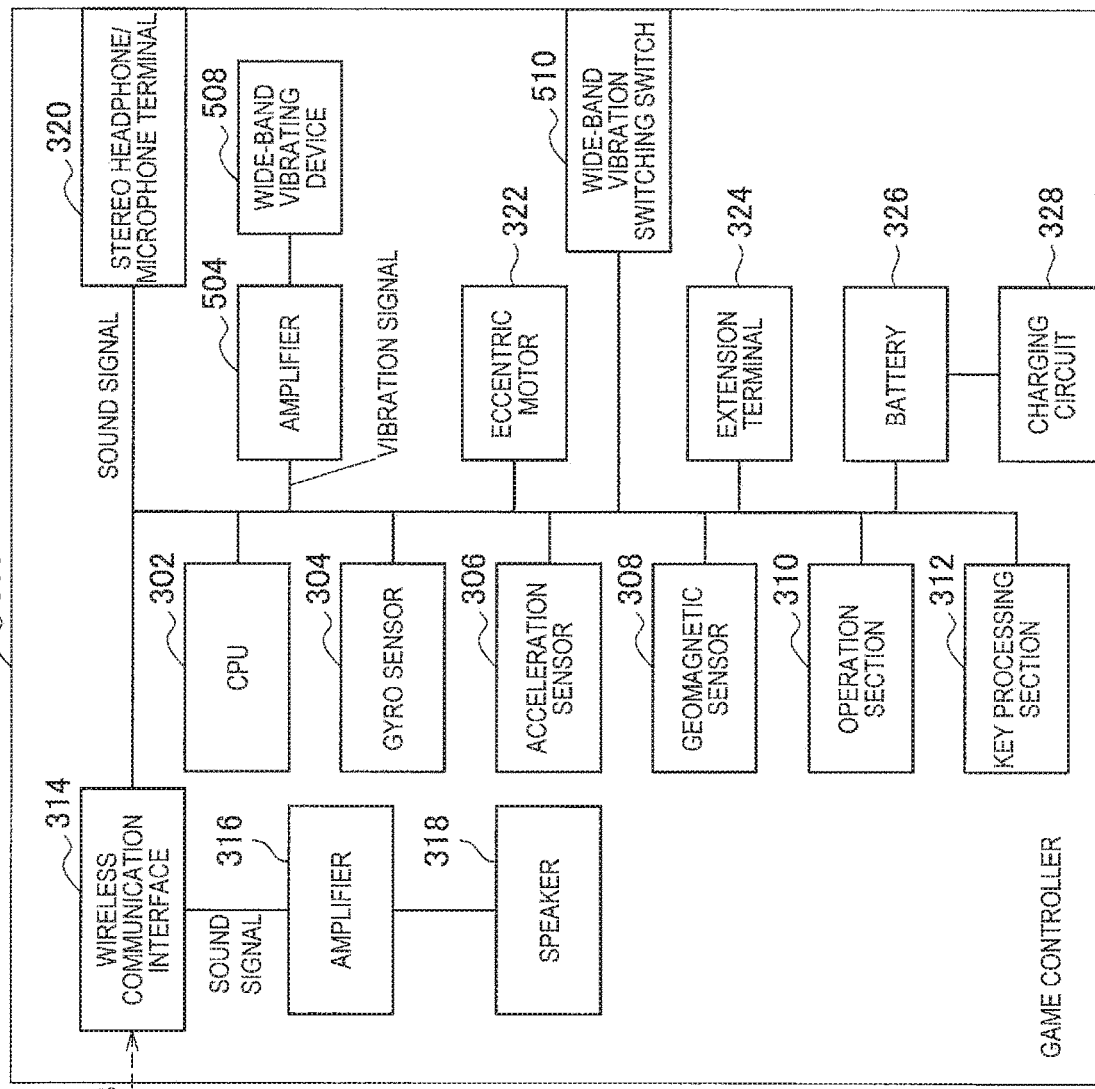
FIG. 15 is a block diagram illustrating a configuration of the game controller illustrated in FIG. 14 in detail.

The configuration of case (3) will be illustrated in FIGS. 13 to 15. Examples of a game controller including only the eccentric motors 322 include a game controller including an eccentric motor (big eccentric motor) including a big weight on the left grip section, and an eccentric motor (small eccentric motor) including a small weight in the right grip section. The game controller 500 illustrated in FIGS. 13 to 15 includes the eccentric motor 322 similar to a big eccentric motor in the left grip section, and further the wide-band vibrating device 508 in the right grip section instead of a small motor. Such a configuration makes it possible to both present strong vibration using the eccentric motor 322 and present high-definition vibration using the wide-band vibrating device 508.

The eccentric motor 322 is driven with the timing and strength of vibration designated by game software. The strength designation causes the eccentric motor 322 to generate vibration at a fixed frequency (after the transient state). For example, in a case where the strength designation has 256 levels, the small eccentric motor vibrates at 56 Hz for a strength designation value of 256. In a case of a strength designation value of 128, the small eccentric motor vibrates at 28 Hz.

The game controller 500 illustrated in FIGS. 13 to 15 then generates vibration to reproduce the vibration of the small eccentric motor using the wide-band vibrating device 508. The vibration signal (Sin-wave waveform that includes the transient state and has a fixed frequency) therefor is generated by the CPU 302 on the basis of a driving signal received by the CPU 302 in the game controller 500 for the small eccentric motor. The vibration signal is generated in accordance with the timing and strength designation value of a driving signal for the small eccentric motor, and provided to the wide-band vibrating device 508.

This allows a user to have a similar operational feeling to that of a game controller including the two of a big eccentric motor and a small eccentric motor that include weights different in weight through the game controller 500 including the eccentric motor 322 and the wide-band vibrating device 508.

FIG. 14 is a block diagram illustrating the configuration of the game controller 500, which uses the eccentric motor 322 and the wide-band vibrating device 508 together. The game console 200 in FIG. 14 has the same configuration as the configuration of the game console 200 illustrated in FIG. 2 except that the game console 200 in FIG. 14 includes an audio interface 216. Further, the game controller 500 in FIG. 14 has the same configuration as the configuration of the game controller 300 illustrated in FIG. 2 except that the game controller 500 in FIG. 14 includes an audio interface 502, an amplifier 504, and an actuator 506.

The configuration in FIG. 14 will be described on the points different from the configuration in FIG. 2. The audio interface 216 of the game console 200 wirelessly transmits a sound signal to the game controller 500. The audio interface 502 of the game controller 500, which receives the sound signal, sends a vibration signal based on the received sound signal to the amplifier 504. The amplifier 504 amplifies the vibration signal. The actuator 506 is driven on the basis of the vibration signal amplified by the amplifier 504.

FIG. 15 is a block diagram illustrating the configuration in more detail than FIG. 14. The game controller 500 illustrated in FIG. 15 includes the eccentric motor 322 and the wide-band vibrating device 508 as vibrating devices. Further, the game controller 500 in FIG. 15 may also include a wide-band vibration switching switch 510.

The wide-band vibration switching switch 510 is a switch of switching the drive state of the wide-band vibrating device 508 in the game controller 500. In a case where the wide-band vibration switching switch 510 is turned off, the game controller 500 behaves in the following method similarly to a game controller including only two eccentric motor.

The wide-band vibration switching switch 510 is useful for suppressing an increase in the power consumption of the game controller 500, for example, for presenting wide-band vibration. Further, the game console 200 can determine that the connected game controller 500 is the game controller 500 including the wide-band vibrating device 508 (the signal therefor is sent to the game console 200 as a wireless signal), on the basis of the ID recognition, the identifier, or the like of the game controller 500.

The operations of the game console 200 and the game controller 500 according to the present configuration example will be described with reference to FIG. 15. As illustrated in FIG. 15, in a case where the game controller 500 including the wide-band vibrating device 508 is connected to the game console 200, the game console 200 recognizes the connection and changes the mode of the game software. Specifically, the CPU 202 of the game console 200 switches a state in which the CPU 202 transmits signals for driving only the eccentric motor to a state in which the CPU 202 transmits signals for driving the eccentric motor 322 and the wide-band vibrating device 508.

Here, it is possible as a method of transmitting a signal for driving the wide-band vibrating device 508 to transmit the signal as a signal obtained by superimposing a sound signal and a vibration signal. Further, wireless sound signals between the game console 200 and the game controller 500 can be exclusively used for a path of sound signals input to the stereo headphone/microphone terminal 320 and a path of vibration signals as illustrated in FIG. 15.

In this case, the CPU 302 of the game controller 500 switches the path to the path for which signals are used, in accordance with the ON/OFF state of the wide-band vibration switching switch 510. In a case where the wide-band vibration switching switch 510 is off, sound signals are sent to the stereo headphone/microphone terminal 320. Meanwhile, in a case where the wide-band vibration switching switch 510 is on, the stereo headphone/microphone terminal 320 is unavailable and sound signals may be configured to be used for generating vibration signals. The wide-band vibrating device 508 may be then driven by the generated vibration signals to achieve vibration feedback.

5. Configuration Example of Game Controller Including Only Wide-Band Vibrating Device The above describes the configuration example of the game controller 500 including the eccentric motor 322 and the wide-band vibrating device 508. The following describes a configuration example of a game controller including only a wide-band vibrating device.

Figure 16:
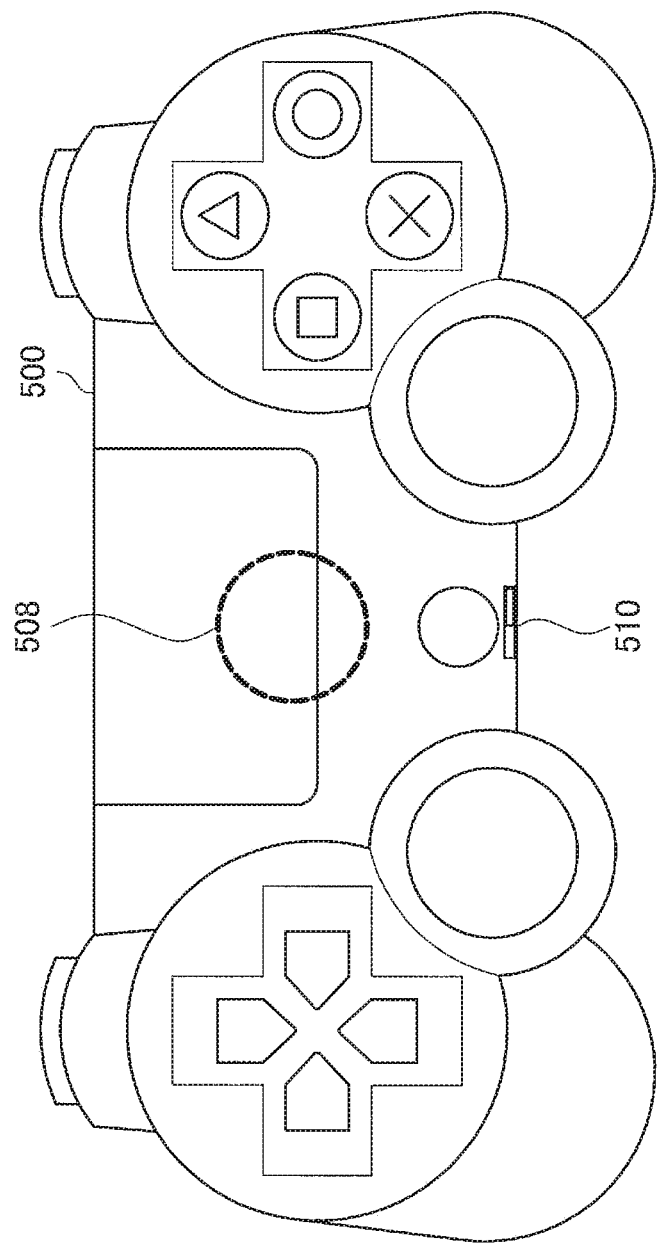
FIG. 16 is a diagram illustrating an example of a disposition position of a wide-band vibrating device in a game controller including only the wide-band vibrating device.

It is possible as another configuration example for achieving wide-band vibration feedback to a game controller that only the wide-band vibrating device 508 is included in a game controller 600 (the eccentric motor 322 is not included) as illustrated in FIGS. 16 and 17. It is desirable that the wide-band vibrating device 508 of the game controller 600 illustrated in FIG. 16 be disposed near the center of the game controller 600 in the horizontal direction so as to uniformly transmit vibration to the left and right grip sections.

FIG. 17 is a block diagram illustrating the configuration of the game controller 600 illustrated in FIG. 16. The game controller 600 illustrated in FIG. 17 has the same configuration as the configuration of the game controller 500 illustrated in FIG. 15 except that the game controller 600 illustrated in FIG. 17 does not include the eccentric motor 322.

Additionally, once the game console 200 recognizes that the game controller 600 including the wide-band vibrating device 508 is connected to the game console 200, the processing mode of the game console 200 may be changed. For example, a signal obtained by combining two driving signals is applied to the wide-band vibrating device 508 to maintain the compatibility of the big and small eccentric motors. This allows a user to have a similar operational feeling to that of a game controller including big and small eccentric motors through the game controller 600 including only the wide-band vibrating device 508. Further, in a case where the wide-band vibrating device 508 presents a sound, the game controller 600 does not have to include the speaker 318 separately.

6. Operation Example of Control on Game Controller Including Vibrating Devices Having Different Characteristics The above proposes the external vibrating unit 400 that includes the wide-band vibrating device 410 and is externally attached to the game controller 300 including the eccentric motor 322 as a vibrating device. Further, the game controller 500 including both the eccentric motor 322 and the wide-band vibrating device 508 as vibrating devices is proposed. Further, the game controller 600 including only the wide-band vibrating device 508 as a vibrating device is proposed.

The above proposed game controllers are apparatuses operated by a user for enjoying game software. The game console 200 may change a process in accordance with the characteristics of a connected controller. For example, the game console 200 may automatically switch the mode of a vibration signal to be output in accordance with the presence or absence of the connection of the above-described external vibrating unit 400, the ID recognition of a game controller, the switching of the wide-band vibration switching switch 510, or the like. Further, the mode of a vibration signal may be switched by a user explicitly switching an operation on the operation screen in a game.

Further, the game console 200 may change a process in accordance with the characteristics of a game controller which the game software supports. That is, the game console 200 changes the processes for first software that generates a signal for only an eccentric motor, for second software that generates signals for both an eccentric motor and a wide-band vibrating device, and for third software that generates a signal for only a wide-band vibrating device, in accordance with software. Such a configuration eliminates the necessity for game software to be updated for game controllers having different operation characteristics, thereby achieving the compatibility of the system. The following describes a process performed by the game console 200 for some kinds of game software that support different vibrating devices.

FIG. 18 is a diagram illustrating processes performed by the game console 200 for game controllers including different vibrating devices and some kinds of game software supporting different vibrating devices. The game controllers can be categorized into a game controller A (such as the above-described game controller 300) including only an eccentric motor, a game controller B (such as the above-described game controller 500) including both an eccentric motor and a wide-band vibrating device, a game controller C (such as the above-described game controller 600) including only a wide-band vibrating device. The kinds of game software can also be categorized similarly into a case (game software A) supporting only eccentric motors, a case (game software B) supporting both eccentric motors and wide-band vibrating devices, and a case (game software C) supporting only wide-band vibrating devices.

The game controller B including both an eccentric motor and a wide-band vibrating device includes a state in which the external vibrating unit 400 including the wide-band vibrating device 410 is attached to the game controller 300 including above-described eccentric motor 322. Additionally, the number of vibrating devices included in a game controller is not limited in particular. Further, a controller may include a big eccentric motor and a small eccentric motor that are different in frequency (include weights different in weight). Further, the processes represented by "○" in FIG. 18 are processes for the time when the game controllers corresponding to the respective kinds of game software are used, and the game console 200 performs no special process.

Additionally, although described in detail below, the game console 200 recognizes the characteristics of a game controller or the type of vibrating device included in the game controller on the basis of the ID or the identifier transmitted from the game controller. For example, in a case where the external vibrating unit 400 including the wide-band vibrating device 410 is attached to the game controller 300 including the eccentric motor 322, the game controller 300 may transmit a different identifier in accordance with the presence or absence of the connection of the external vibrating unit 400. Further, the game controller 500 including the above-described wide-band vibration switching switch 510 may transmit a different identifier in accordance with the switching of the wide-band vibration switching switch 510.

(Process of Game Console in Game Software Supporting Only Eccentric Motors)

First, a process of the game console 200 for the game software A will be described. The game software A is created on the condition of a game controller including no wide-band vibrating device. As illustrated in FIG. 18, the game console 200 performs a process A1 or a process A2 for the game controller B including both an eccentric motor and a wide-band vibrating device in the game software A. Further, the game console 200 performs a process B1 or a process B2 or a process B3 for the game controller C including only a wide-band vibrating device. The following describes each process.

(Process A1)

Originally, the game software A, which outputs only vibration signals for eccentric motors, generates vibration signals (pulsed DC drive waveform) for driving an eccentric motor. The game CPU 202 of the console 200 generates vibration signals for eccentric motors for an eccentric motor as illustrated in FIG. 7, and further generates vibration signals for eccentric motors similarly for a wide-band vibrating device in the process A1. As described above, this is because the wide-band vibrating device can generate similar vibration to the vibration of the eccentric motor. Additionally, the timing at which the wide-band vibrating device vibrates may correspond to on and off of vibration signals for eccentric motors.

(Process A2)

A process for using the wide-band characteristics of a wide-band vibrating device is performed in the process A2. The game software A does not generate vibration signals for the wide-band vibrating device. The vibration signals appropriate for the wide-band vibrating device are, however, generated using sound signals generated by the game software A. For example, a gun sound, a vehicle engine sound, or the like in the game software is used.

Specifically, vibration signals for eccentric motors are output to an eccentric motor, and an analog waveform obtained by processing sound signals of the game is output to a wide-band vibrating device as vibration signals in the process A2. For example, the CPU 202 of the game console 200 may perform a low-pass filtering process on sound signals of the game, and separate or extract the low frequency components from the sound signals. The separated and extracted low frequency components of the sound signals may be provided to the wide-band vibrating device via an amplifier as the vibration signals appropriate for presenting vibration.

The low component of a sound signal (corresponding to the sound signal A in FIG. 6) of the game may be separated and extracted, for example, through the configuration similar to the configuration of the external vibrating unit 400 in FIG. 4. The DSP 406 (or an analog circuit) in the external vibrating unit 400 in FIG. 4 separates and extracts the low frequency components of sound signals.

Since the human tactile receptor characteristically senses only vibration having a relatively low frequency band of 500 Hz or less, the low frequency components of sound signals are appropriate as signals used for vibration signals. Further, the high frequency components of the frequency may be used as sound signals for headphones.

As described above, only when sound signals include low frequency components, it is possible to separate and extract the low frequency components from the sound signals. That is, in a case where the sound signals of the game have no low frequency components of 500 Hz or less, a user cannot have a sense of vibration in spite of driving the wide-band vibrating device on the basis of these sound signals. The CPU 202 of the game console 200 may then convert sound signals in higher frequency bands through a process such as pitch shifting (pitch conversion process) into low frequency signals. This pitch shifting allows a user to sufficiently have a sense of vibration without depending on the frequency distribution of sound signals.

Thus, when sound signals include no low frequency components, a process such as low-pass filtering does not have to be performed on the sound signals, but the pitch of the frequency of the sound signals may be shifted. This pitch shifting presents more preferable vibration to a user.

Pitch shifting performs the fast Fourier transform (FFT) process on sound signals, and then shifts the peak of the transformed waveform to a range of 500 Hz or less. The inverse Fourier transform is carried out on the shifted waveform for pitch shifting, and the vibration signals appropriate for driving the wide-band vibrating device are generated.

Additionally, the shift amount of pitch shifting may be changed in accordance with the characteristics of the wide-band vibrating device or the characteristics of the game controller including the wide-band vibrating device. For example, the shift amount may be decided in a manner that the resonance frequency of the wide-band vibrating device or the game controller including the wide-band vibrating device serves as the peak of the waveform subjected to the transform process of FFT.

Further, the CPU 202 of the game console 200 may compute the effective value of sound signals for each fixed section, and generate vibration signals for the wide-band vibrating device on the basis of the computed envelope shapes of the sound signals. This process is illustrated in FIGS. 19*a*, 19*b*, 19*c*, 19*d* and 19*e*.

The above-described process will be described with reference to FIGS. 19*a*, 19*b*, 19*c*, 19*d* and 19*e*. FIGS. 19*a*, 19*b*, 19*c*, 19*d* and 19*e* are diagrams illustrating waveforms with the horizontal axes representing time, and the vertical axes representing the signal amplitudes. The waveform in FIG. 19*a* illustrates the waveform of sound signals (such as the sounds of gunfire) generated on the basis of a game. The waveform in FIG. 19*b* illustrates the waveform of the sound signals in a which have been subjected to a low-pass filtering process.

Further, the waveform in FIG. 19*c* illustrates the envelope shape computed by calculating the effective value of the above-described waveform in a for each fixed section. The waveform in FIG. 19*d* is the sin wave that indicates the resonance frequency of a wide-band vibrating device included in the external vibrating unit 400 or a game controller. The product of the waveform illustrated in FIG. 19*c* and the waveform illustrated in FIG. 19*d* is then calculated to compute the waveform illustrated in FIG. 19*e*. This waveform illustrated in e is used as vibration signals for the wide-band vibrating device. Moreover, adding the waveform in FIG. 19*b* to the waveform in FIG. 19*e* at a given rate can broaden the band of signals and enhance the expressive power of vibration.

The above describes the example in which sound signals of a game are processed and used as vibration signals for a wide-band device. However, sound signals of a game may also be used as vibration signals for a wide-band vibrating device with no process.

Further, signals sent from the game console 200 to a game controller may be time-divided. In this case, sound signals and vibration signals are superimposed and transmitted to the game controller or the external vibrating unit 400. The game controller or the DSP 406 in the external vibrating unit 400 may then perform a separation process on the sound signals. In this case, the transmitted signals have a special format.

The above describes the processes A1 and A2 of the game console 200 for the game controller B including an eccentric motor and a wide-band vibrating device in the game software A supporting only eccentric motors. The following describes a process of the game console 200 for the game controller C including only a wide-band vibrating device in the game software A supporting only eccentric motors. In this case, the game console 200 performs the process B1 or the process B2 or the process B3 or a process B4.

(Process B1)

A process similar to that of the process A1 is performed in the process B1. Specifically, the CPU 202 of the game console 200 outputs vibration signals for eccentric motors to a wide-band vibrating device as illustrated in FIG. 7. Additionally, the timing at which the wide-band vibrating device vibrates corresponds to on and off of vibration signals for eccentric motors. Further, in a case where the game software A generates vibration signals for a big eccentric motor and a small eccentric motor, the CPU 202 of the game console 200 may generate vibration signals to wide-band vibrating devices included in the game controller C in a manner that the big and small eccentric motors are supported.
(Process B2)

A process similar to that of the process A2 is performed in the process B2. Specifically, the CPU 202 of the game console 200 outputs, to a wide-band vibrating device, vibration signals based on sound signals of a game. As described above, the CPU 202 of the game console 200 may extract only the low frequency components from sound signals, and output the extracted low frequency components as vibration signals for a wide-band vibrating device. Further, the CPU 202 of the game console 200 may shift and output the pitch of sound signals as vibration signals for a wide-band vibrating device.
(Process B3)

The process B3 is a process for a case where the game controller C includes wide-band vibrating devices. The CPU 202 of the game console 200 outputs vibration signals for eccentric motors to one of the wide-band vibrating devices, and outputs vibration signals based on sound signals of a game to the other wide-band vibrating devices in the process B3. Performing such a process, a user can acquire high-definition tactile feedback acquired from an eccentric motor and a wide-band vibrating device using a game controller including only a wide-band vibrating device.
(Process B4)

The process B4 is a process obtained by combining the process B1 with the process B2. Specifically, the CPU 202 of the game console 200 overlay the vibration signals for eccentric motors which are output in the process B1 on vibration signals based on sound signals of a game which are output in the process B2, and outputs the overlaid vibration signals to a wide-band vibrating device.

Figure 20:
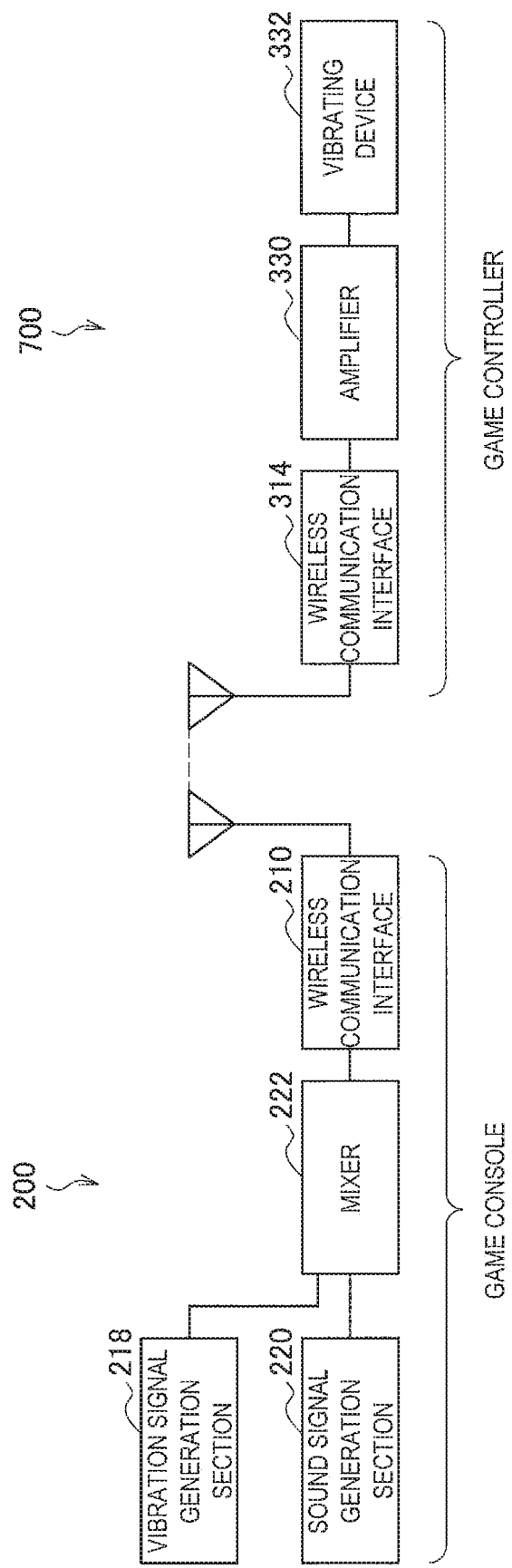
FIG. 20 is a diagram illustrating an example of a configuration of an apparatus that mixes and outputs a vibration signal and a sound signal.

FIG. 20 illustrates a configuration example of an apparatus for a case where vibration signals for eccentric motors are overlaid on vibration signals based on sound signals, and the overlaid vibration signals are then output. As illustrated in FIG. 20, the game console 200 includes a vibration signal generation section 218 and a sound signal generation section 220, and includes a mixer 222 that mixes signals of the respective sections into a single signal. A wide-band vibrating device of interest in the present disclosure has a wide frequency band output from vibration to sound. Accordingly, it is possible to mix both signals and treat the mixed signals as vibration signals. The output side (game console 200) can therefore treat a sound output and a vibration output in a single signal path. A game controller 700 amplifies the mixed signals received from the game console 200 in an amplifier 330 to vibrate a vibrating device 332.
(Process of Game Console in Game Software Supporting Eccentric Motors and Wide-Band Vibrating Devices)

The above describes the process of the game console 200 in the game software A supporting only eccentric motors. The following describes a process of the game console 200 in the game software B supporting eccentric motors and wide-band vibrating devices. As illustrated in FIG. 18, the game console 200 performs a process C1 or a process C2 or a process C3 on the game controller A including only an eccentric motor in the game software B. Further, the game console 200 performs a process D1 or a process D2 or a process D3 or a process D4 for the game controller C including only a wide-band vibrating device. The following describes the respective processes.
(Process C1)

The game console 200 can generate both vibration signals for an eccentric motor and vibration signals for a wide-band vibrating device in the game software B. The game console 200 therefore outputs vibration signals for eccentric motors as illustrated in FIG. 7 to the game controller A including only an eccentric motor in the process C1.
(Process C2)

Figure 21:
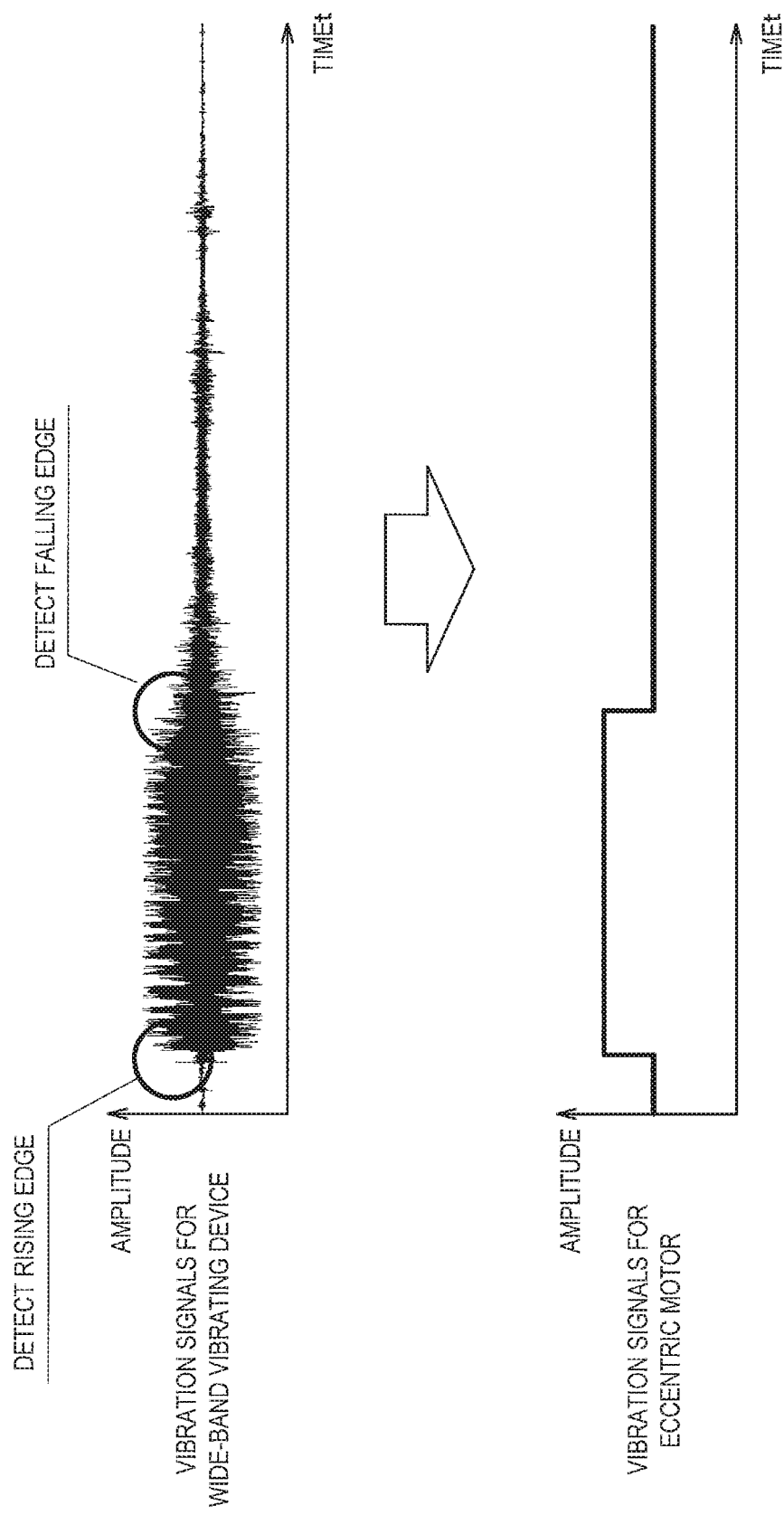
FIG. 21 is a diagram illustrating an example of a process of generating a vibration signal for an eccentric motor from a vibration signal for a wide-band vibrating device.

The game console 200 generates vibration signals for an eccentric motor on the basis of vibration signals for a wide-band vibrating device in the process C2. This process will be described with reference to FIG. 21. The top of FIG. 21 illustrates vibration signals for a wide-band vibrating device which are generated on the basis of the game software B.

The CPU 202 of the game console 200 detects as a rising edge that a value such as the amplitude of these vibration signals for the wide-band vibrating device, or the effective value thereof, or the amplitude average within the time which is calculated in another method is a predetermined threshold or higher, and similarly detects as a falling edge that the value is a predetermined threshold or less. These two thresholds may be different. The CPU 202 of the game console 200 then generates the DC voltage waveform as illustrated in the bottom of FIG. 21 on the basis of the detected rising time and falling time. The game console 200 outputs this DC voltage waveform to the eccentric motor.
(Process C3)

The process C3 is a process for the game controller A including a big eccentric motor including a big weight and a small eccentric motor including a small weight. In this case, the CPU 202 of the game console 200 may generate vibration signals for the respective eccentric motors. For example, once the CPU 202 of the game console 200 detects a rising edge of vibration signals for wide-band vibrating devices on the basis of the process described with reference to FIG. 21, the CPU 202 of the game console 200 performs the FFT process on those vibration signals. The CPU 202 of the game console 200 then extracts the low frequency components (e.g., 0 to 100 Hz) and the high frequency component (e.g., 100 to 200 Hz) from the vibration signals for wide-band vibrating devices, and generates the DC voltage waveform based on each of the frequency components.

The CPU 202 of the game console 200 then outputs the generated DC voltage based on the low frequency components as vibration signals for the big eccentric motor. Further, similarly, the CPU 202 of the game console 200 outputs the generated DC voltage based on the high frequency components as vibration signals for the small eccentric motor. Such a configuration generates the vibration signals appropriate for the big and small eccentric motors, and then allows a user to acquire high-definition tactile feedback.

Figure 22:
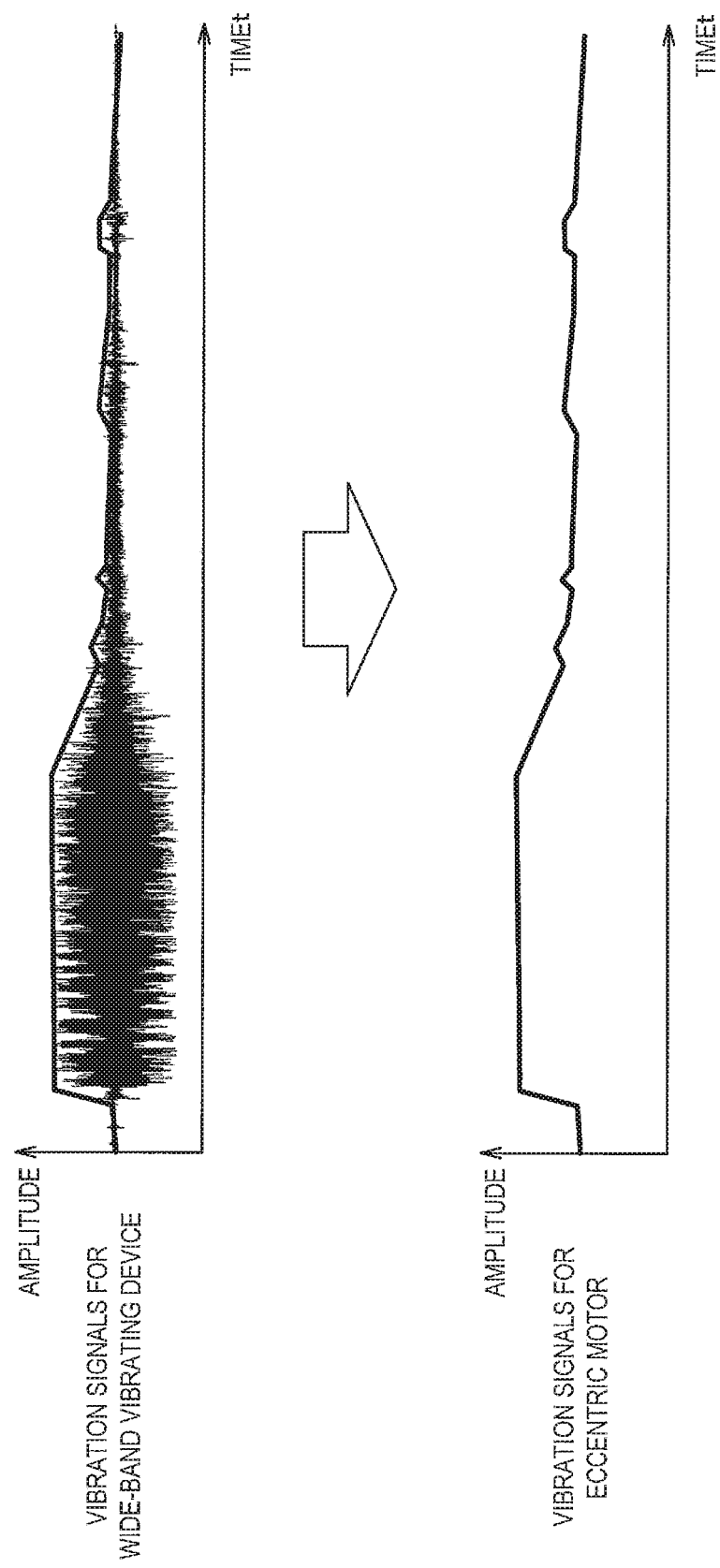
FIG. 22 is a diagram illustrating another example of a process of generating a vibration signal for an eccentric motor from a vibration signal for a wide-band vibrating device.

Further, the CPU 202 of the game console 200 may compute (envelope) the effective value of sound signals for the vibration signals for the wide-band vibrating device for each fixed section, and generate vibration signals for the eccentric motors on the basis of the computed envelope shape of the vibration signals. FIG. 22 is a diagram illustrating a process of generating this envelope waveform. The game console 200 may output this envelope waveform as vibration signals for the eccentric motors. Additionally, the envelope shape is directly reflected on the amplitude (DC voltage value) of signals input to the eccentric motors in FIG. 22. However, since the eccentric motors are not responsive, a low voltage input does not increase the rotation speed of the eccentric motors. Accordingly, it is supposed that sufficient vibration cannot be acquired. The game console 200 may then output, as vibration signals, the size of the envelope shape that is converted not into the amplitude of signals input to the eccentric motors, but into the pulsed length of input time. Specifically, when the envelope shape is small, the pulse on time is shorter. Conversely, when the envelope shape is large, the pulse on time is longer. That is, a waveform input into the eccentric motors is a digital waveform that changes on and off time.

Figure 23:
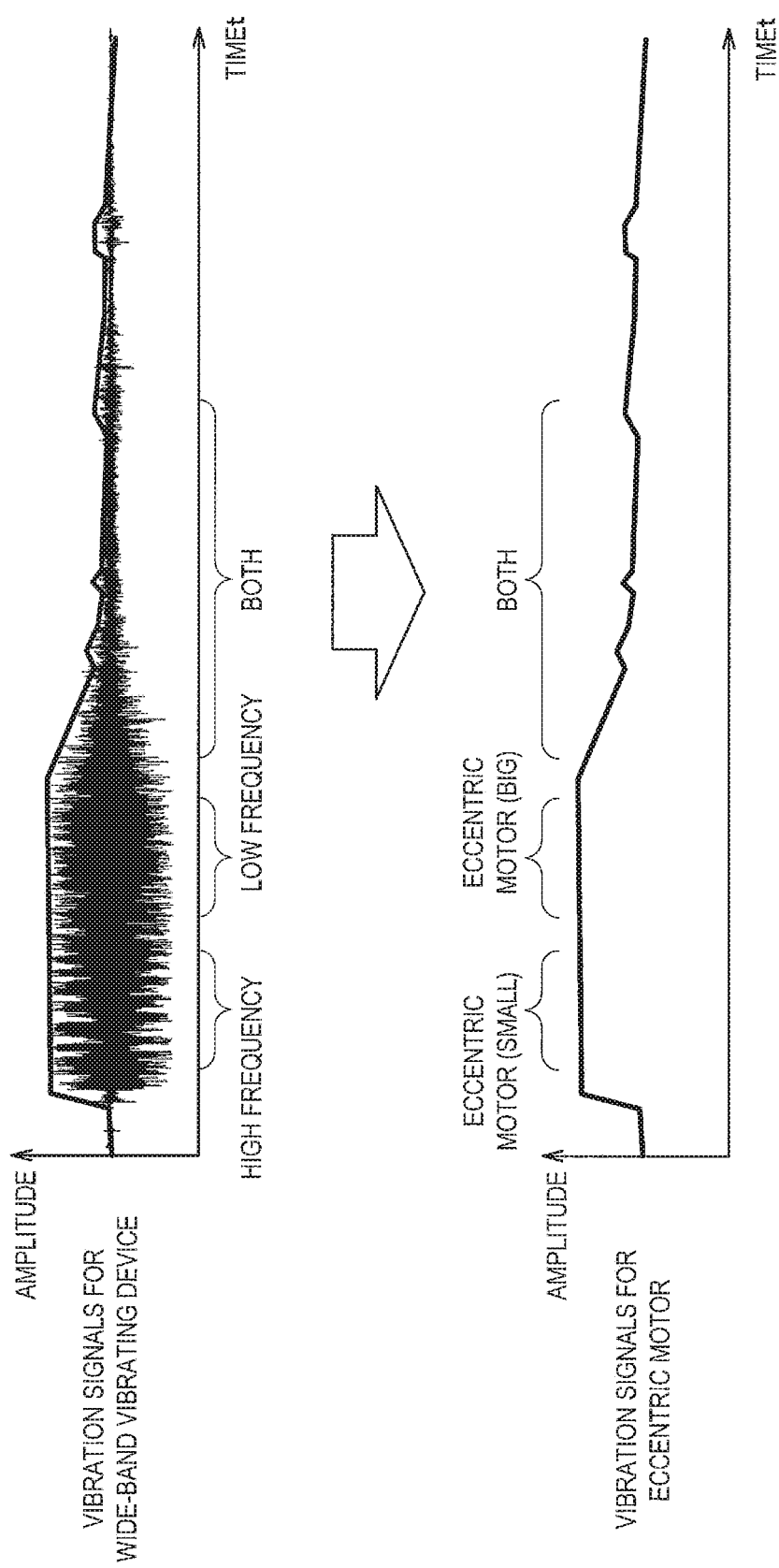
FIG. 23 is a diagram illustrating another example of a process of generating a vibration signal for an eccentric motor from a vibration signal for a wide-band vibrating device.

Further, the CPU 202 of the game console 200 may generate the above-described envelope waveform and perform the FFT process to extract vibration signals for the big eccentric motor and the small eccentric motor using the frequency. FIG. 23 is a diagram illustrating a process of generating this envelope waveform and performing the FFT process. The CPU 202 of the game console 200 outputs the high frequency components having the generated envelope waveform to the small eccentric motor, and outputs the low frequency components having the envelope waveform to the big eccentric motor. Further, vibration signals may be output to both the big eccentric motor and the small eccentric motor with respect to a predetermined frequency. For example, in a case where the original frequency components of signals input to the wide-band vibrating device chiefly include high frequency components, the CPU 202 of the game console 200 performs a process of driving the big eccentric motor on the basis of the envelope shape. In a case where the original frequency components of signals input to the wide-band vibrating device chiefly include low frequency components, the CPU 202 of the game console 200 performs a process of driving the small eccentric motor on the basis of the envelope shape. Further, in a case where both high frequency components and low frequency components are included, vibration signals may be output to both the big eccentric motor and the small eccentric motor. It is decided on the basis of the characteristics of the eccentric motors how to associate the frequency distribution with the eccentric motors. However, since a small eccentric motor including a small (light) weight generally has a higher vibration frequency for the same input voltage than that of a big eccentric motor, a small eccentric motor is more appropriate for presenting high frequency vibration.

The above describes the process for the game controller A including only an eccentric motor in the game software B supporting eccentric motors and wide-band vibrating devices. The following describes a process for the game controller C including only a wide-band vibrating device in the game software B supporting eccentric motors and wide-band vibrating devices.

(Process D1)

The CPU 202 of the game console 200 outputs vibration signals for eccentric motors as illustrated in FIG. 7 to a wide-band vibrating device in the process D1. Additionally, in a case where the game software B generates vibration signals for a big eccentric motor and a small eccentric motor, the CPU 202 of the game console 200 may output vibration signals obtained by combining the vibration signals for both the big and small eccentric motors to the wide-band vibrating device. Such a configuration allows a user to acquire tactile feedback similar to tactile feedback generated by the big and small eccentric motors.

(Process D2)

The CPU 202 of the game console 200 outputs vibration signals for wide-band vibrating devices which are generated by the game software B to a wide-band vibrating device in the process D2.

(Process D3)

The process D3 is a process for the game controller C including wide-band vibrating devices. In this case, the CPU 202 of the game console 200 may output vibration signals for eccentric motors to one of the wide-band vibrating devices, and output vibration signals for wide-band vibrating devices to the other wide-band vibrating devices. Additionally, the vibration signals for eccentric motors output to the wide-band vibrating device may be then vibration signals obtained by combining the vibration signals for the big eccentric motor and the small eccentric motor.

(Process D4)

The CPU 202 of the game console 200 may output vibration signals obtained by overlaying vibration signals for wide-band vibrating devices on vibration signals for eccentric motors to a wide-band vibrating device in the process D4.

(Process of Game Console in Game Software Supporting Only Wide-Band Vibrating Devices)

The above describes the process for the game controller C including only a wide-band vibrating device in the game software B supporting eccentric motors and wide-band vibrating devices. The following describes a process for the game controller A including only an eccentric motor and a process for the controller B including an eccentric motor and a wide-band vibrating device in the game software C supporting only wide-band vibrating devices.

As illustrated in FIG. 18, the game console 200 performs a process E on the game controller A including only an eccentric motor in the game software C. Further, the game console 200 performs a process F1 or a process F2 for the game controller B including both an eccentric motor and a wide-band vibrating device.

(Process E)

The CPU 202 of the game console 200 outputs vibration signals for wide-band vibrating devices to an eccentric motor in the process E. For example, the CPU 202 of the game console 200 performs a process as illustrated in FIG. 21 or 22 or 23, and generates vibration signals for the eccentric motor on the basis of the vibration signal for wide-band vibrating devices.

The above describes the process for the game controller A including only an eccentric motor in the game software C supporting only wide-band vibrating devices. The following describes a process for the game controller B including an eccentric motor and a wide-band vibrating device in the game software C supporting only wide-band vibrating devices.

(Process F1)

The CPU 202 of the game console 200 outputs no vibration signals to an eccentric motor, but outputs vibration signals for wide-band vibrating devices to only a wide-band vibrating device in the process F1.

(Process F2)

The CPU 202 of the game console 200 outputs vibration signals for wide-band vibrating devices to an eccentric motor in the process F2. For example, the CPU 202 of the game console 200 performs a process as illustrated in FIG. 21 or 22 or 23, and generates vibration signals for the eccentric motor on the basis of the vibration signal for wide-band vibrating devices. The CPU 202 of the game console 200 then outputs the vibration signals generated on the basis of the vibration signals for wide-band vibrating devices to the eccentric motor, and outputs the vibration signals for wide-band vibrating devices to the wide-band vibrating device.

As described above, the CPU 202 of the game console 200 can change control on a game controller in accordance with the type of game software and the characteristics of the game controller. Such a configuration allows a user to acquire the tactile feedback appropriate for a game controller of the user. Further, game software does not have to be updated for game controllers having different operation characteristics, thereby achieving the compatibility of the system.

7. Operation Example for Game Console to Switch Control

The above describes the operation example of control on a game controller including vibrating devices having different characteristics. The following describes a process operation for the game console 200 to switch control.

A game controller may be configured to transmit information on a vibrating device included in the game controller to the game console 200. For example, a game controller may store at least one of an identifier A, an identifier B, and an identifier C in advance. The identifier A indicates that only an eccentric motor is included. The identifier B indicates that an eccentric motor and a wide-band vibrating device are included. The identifier C indicates that only a wide-band vibrating device is included.

When the game controller is connected to the game console 200, the game controller then transmits any one of the identifier A or the identifier B or the identifier C to the game console 200. The game console 200, which receives the identifier, determines the characteristics of the connected game controller using the identifier, and switches the process.

For example, in a case where the external vibrating unit 400 is connected to the game controller 300 as illustrated in FIGS. 3*a*, 3*b*, 3*c*, 4, 5A(a), 5A(b), 5A(c), 5B and 6 the game console 200 may change the process in accordance with the presence or absence of the connection of the external vibrating unit 400. Additionally, the following describes the operation of the game console 200 in game software such as the game software B illustrated in FIG. 18 which is created on the condition that a game controller includes an eccentric motor and a wide-band vibrating device.

In a case of the configurations illustrated in FIGS. 3*a*, 3*b*, 3*c*, 4, 5A(a), 5A(b), 5A(c), 5B and 6, the game controller 300 sends the identifier A to the game console 200 with the external vibrating unit 400 not connected to the game controller 300. The game console 200, which receives the identifier A, determines that the game controller 300 includes only the eccentric motor 322, and sends only vibration signals for the eccentric motor 322 to the game controller 300 as signals for vibration.

Meanwhile, in a case where the external vibrating unit 400 is connected to the game controller 300, the game controller 300 transmits, to the game console 200, information indicating that the external vibrating unit 400 is connected. That is, the game controller 300 transmits the identifier B to the game console 200. The game console 200, which receives the identifier B, recognizes the connection of the external vibrating unit 400 from the information transmitted from the game controller 300. The game console 200 then sends both signals for the eccentric motor 322 and signals for the wide-band vibrating device 410 to the game controller 300 as vibration signals.

The above describes the example in which the external vibrating unit 400 including the wide-band vibrating device 410 is connected to the game controller 300, which is illustrated in FIGS. 3*a*, 3*b*, 3*c*, 4, 5A(a), 5A(b), 5A(c), 5B and 6 and includes the eccentric motor 322. However, a similar operation is also performed in the game controller 500, which is illustrated in FIGS. 13 to 15 and includes the eccentric motor 322 and the wide-band vibrating device 508.

That is, if the wide-band vibration switching switch 510 is off in the game controller 500 illustrated FIGS. 13 to 15, the game controller 500 transmits the identifier A to the game console 200. The game console 200, which receives the identifier A, transmits only vibration signals for the eccentric motor 322 to the game controller 500.

Further, if the wide-band vibration switching switch 510 is on in the game controller 500 illustrated FIGS. 13 to 15, the game controller 500 transmits the identifier B to the game console 200. The game console 200, which receives the identifier B from the game controller, then transmits vibration signals for the eccentric motor 322 and vibration signals for the wide-band vibrating device 508 to the game controller 500.

The above describes the specific operation switching example of the game console 200 in game software such as the game software B illustrated in FIG. 18. This operation switching of the game console 200 will be described more generally. The game console 200 switches the processes from the process A1 to the process F2 illustrated in FIG. 18 on the basis of the type of game software and the type of game controller.

For example, a case will be described where the game console 200 executes the game software A supporting only eccentric motors. In this case, if the game console 200 receives the identifier A from a game controller, the game console 200 transmits only vibration signals for eccentric motors to the game controller.

Further, if the game console 200 receives the identifier B from the game controller, the game console 200 performs the process A1 or the process A2. Further, if the game console 200 receives the identifier C from a game controller, the game console 200 performs the process B1 or the process B2 or the process B3 or the process B4.

Next, a case will be described where the game console 200 executes the game software B supporting eccentric motors and wide-band vibrating devices. In this case, if the game console 200 receives the identifier A from the game controller, the game console 200 performs the process C1 or the process C2 or the process C3.

Further, if the game console 200 receives the identifier B from a game controller, the game console 200 transmits vibration signals for eccentric motors and vibration signals for wide-band vibrating devices to the game controller. Further, if the game console 200 receives the identifier C from the game controller, the game console 200 performs the process D1 or the process D2 or the process D3 or the process D4.

Next, a case will be described where the game console 200 executes the game software C supporting only wide-band vibrating devices. In this case, if the game console 200 receives the identifier A from the game controller, the game console 200 performs the process E.

Further, if the game console 200 receives the identifier B from the game controller, the game console 200 performs the process F1 or the process F2. Further, if the game console 200 receives the identifier C from the game controller, the game console 200 transmits vibration signals for wide-band vibrating devices to the game controller.

As described above, a game controller may transmit, to the game console 200, the identifier indicating the type of vibrating device included in the game controller on the basis of the type of vibrating device. Further, the game console 200 may switch the operation on the basis of an identifier received from a game controller. Such a configuration eliminates the necessity for game software to be updated for game controllers having different operation characteristics, thereby achieving the compatibility of the system.

The above describes the operation switching of the game console 200 focusing on the type of vibrating device included in a game controller. The operation of the game console 200 may be, however, switched in accordance with not the type of vibrating device, but the other characteristics of a game controller.

For example, a game controller may transmit information on the resonance frequency of the game controller to the game console 200. The game console 200, which receives the resonance frequency of the game controller, may change the shift amount of pitch shifting described above on the basis of the received resonance frequency. Such a configuration allows a user to acquire greater tactile feedback.

Figure 24:
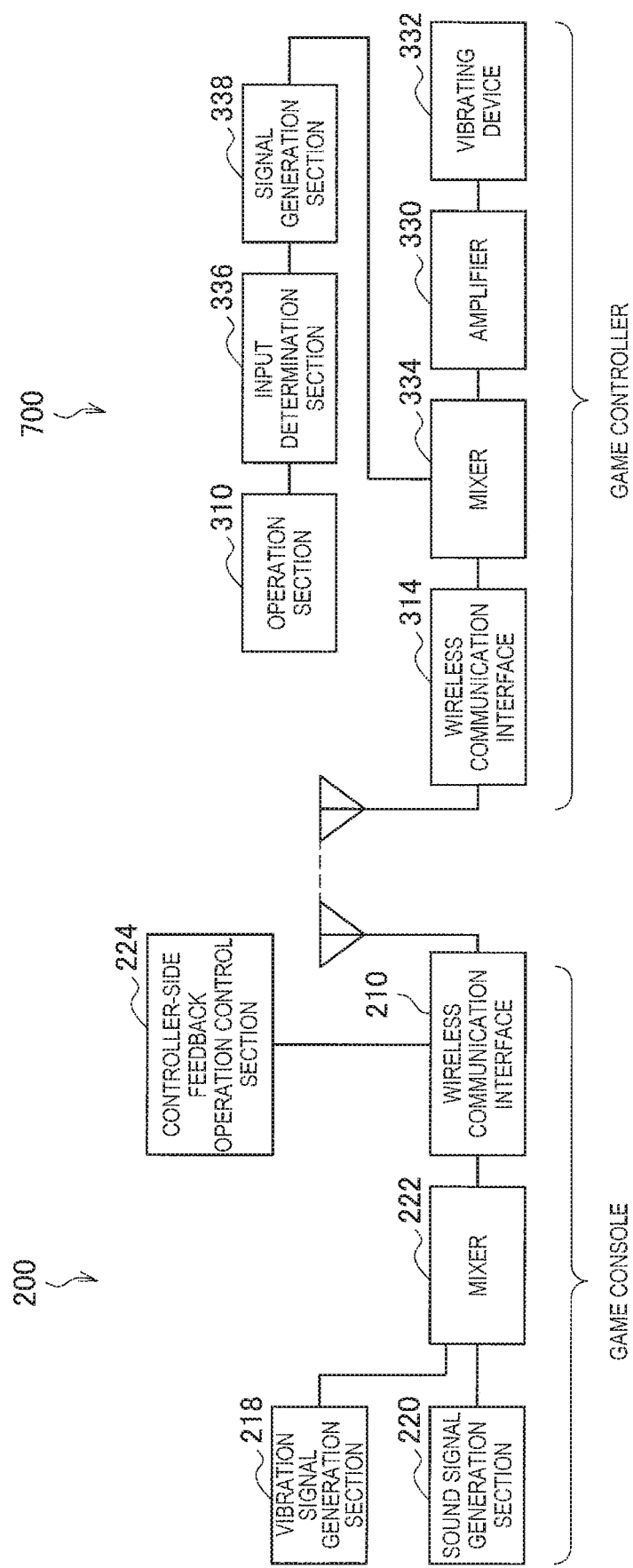
FIG. 24 is a diagram illustrating a configuration example in which a signal generation section that generates a vibration signal is included on a game controller side.

8. Operation Example in Case where Game Controller Generates Vibration Signal The above describes the example in which the CPU 202 of the game console 200 generates vibration signals. However, vibration signals may also be generated in a game controller or the external vibrating unit 400. FIG. 24 illustrates the configuration of the apparatus in such a case. In this configuration, the game controller 700 also includes a signal generation section 338 characteristically. The signal generation section 338 of the game controller 700 may be capable of generating not only vibration signals, but also sound signals. Further, the game console 200 may generate signals for a complicated expression linked to a scene of a game such as vibration or sound feedback of a vehicle collision.

Further, in this configuration, tactile feedback requiring quick responsiveness may be imparted using signals generated with a closed path on the game controller 700 side. For example, a latch feeling expression or the like corresponding to the inclination of an analog stick is immediately fed back to a user by being generated in the game controller 700.

In the configuration illustrated in FIG. 24, a user operates the operation section 310, and an input determination section 336 detects the content of the operation. The signal generation section 338 of the game controller 700 generates vibration signals on the basis of the content determined by the input determination section 336. The vibration signal generated by the signal generation section 338 is sent to the amplifier 330, and the amplifier 330 amplifies the vibration signals. The amplified vibration signals then vibrate the vibrating device 332.

Further, the game controller 700 and the game console 200 include the mixer 222 and a mixer 334 that mix signals (sound signals and vibration signals) of two systems. The game controller 700 and the game console 200 can appropriately mix and output both signals.

Additionally, signals generated by the signal generation section 338 of the game controller 700 may be preset or dynamically generated using a signal generator or a calculator. Moreover, the input gain of the mixer 334 of the game controller 700 may be variable, and controlled by a game controller feedback operation control section 224 in the game console 200 or the game controller 700 itself.

To minimize delay in the vibration expressing the impact of gunfire in game software such as a shooting game, the game controller 700 may store data for generating vibration signals related to the gunfire.

The game controller 700 may be then configured to read the stored vibration signals of gunfire and generate vibration signals in the signal generation section 338 when a user inputs gunfire in a game by operating the operation section 310.

There are some cases as a method for the game controller 700 to acquire data for generating vibration signals. For example, the game console 200 may transmit data for generating vibration signals to the game controller 700 when the game console 200 loads game software, a scene of a game is switched, or the type of gun is switched.

Data for generating vibrations signals for the game console 200 to transmit to the game controller 700 may come in a single type, or some types of data may also be transmitted to the game controller 700. In a case where some types of data are transmitted from the game console 200, the game controller 700 stores those types of data. The game controller 700 may be configured to select appropriate data from those types of data that are stored, when the game console 200 transmits, to the game controller 700, information indicating that a scene is switched or the type of gun is switched. Further, in a case where the game controller 700 stores some kinds of data, the game controller 700 may select appropriate data from those kinds of data on the basis of type information of vibration data transmitted by the game console 200.

If the game controller 700 is configured as described above, the game console 200 does not have to transmit vibration data. Accordingly, it is possible to reduce delay time, and prevent part of data from being missing. Further, in a case where the game console 200 transmits not vibration signals, but type information of vibration signals, it is advantageous that no vibration is generated even if a user operates the operation section 310 (such as a dedicated trigger button that is used when a gun is fired at a game controller) while the user is not playing a game.

Further, for example, in a case where the game controller 700 is specialized in shooting games, the game controller 700 may store a single predetermined type of feedback data (such as data expressing the impact of a gun) in a memory at product shipment. In such a case, vibration data may be reproduced irrespective of the situation of a game when a user operates a trigger button. Further, in a case where the game controller 700 stores a predetermined type of vibration data in advance, the game console 200 may transmit, to the game controller 700, only information related to the timing (e.g., the time of gunfire in a game) of data reproduction.

Further, in a case where the game controller 700 stores predetermined types of feedback data in a memory at product shipment, the game console 200 may transmit, to the game controller 700, information indicating which type of data is used. As the timing at which the game console 200 transmits information indicating feedback data to be used may be the timing of loading a game or switching a scene or switching the type of gun or the like. Alternatively, in a case where the game controller 700 stores a predetermined type of vibration data in advance, the game console 200 may transmit, to the game controller, only information related to the timing (e.g., the time of gunfire in a game) of data reproduction.

Additionally, the above describes the configuration in which vibration control is performed by only the game controller 700 using tactile feedback data stored in the game controller 700. The vibration function of the game controller 700 may be, however, controlled by mixing vibration data generated by the game console 200 and transmitted to the game controller 700 and vibration data stored in the game controller 700. Mixing makes it possible to both reproduce vibration having a simple pattern such as the impact of gunfire with low delay and reproduce vibration having a complicated pattern.

Further, the above describes the case as an example where vibration is presented to a user using a vibrating device. However, the above-described processes can be similarly applied to, for example, a case sound feedback is imparted from a game controller, a case where (not vibration, but) the magnitude of force or stiffness is fed back by a game controller using a motor or the like in addition to a case where vibration is presented.

9. Supplemental Information

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in a case where vibration signals for a wide-band vibrating device are generated on the basis of sound signals, an appropriate process may be performed on the sound signals. For example, vibration signals may be generated by carrying out, on sound signals, the characteristic correction corresponding to the characteristics of a wide-band vibrating device. This generates the vibration signals corresponding to the characteristics of the wide-band vibrating device.

Further, filter control may be performed that emphasizes vibration in accordance with the type of game software. For example, in a case where game software is a shooting game, a filter may be controlled to emphasize vibration related to gunfire. Further, in a case where game software is car racing game software, filter control may be performed that emphasizes engine sounds. The type of game software may be determined using a tag allocated to game software.

Further, in a case where vibration signals are generated on the basis of sound signals, a process on the vibration signals may be changed in accordance with the type of sound signal. For example, in a case where sound signals represent human voice, control may be performed to generate no vibration signals or not to vibrate a vibrating device. The type of sound signal may be determined using a tag allocated to sound signals.

Further, in a case where vibration signals for a wide-band vibrating device are generated on the basis of sound signals, a wide-band vibrating device vibrates at the timing at which it is preferable that the wide-band vibrating device for human voice or the like should not vibrate. The wide-band vibrating device may be therefore configured to vibrate only when an eccentric motor vibrates. This is because the timing at which the eccentric motor vibrates is appropriate as the timing at which tactile feedback is imparted to a user.

Further, a game console may analyze an image, and the game console may vibrate a vibrating device in a specific scene. For example, if the CPU of the game console determines as a result of image analysis that the scene is a soccer PK scene, the CPU of the game console may generate vibration signals that simulate the sounds of heartbeat. Such a configuration allows a user to acquire the tactile feedback corresponding to a scene.

Further, a wide-band vibrating device may receive sound signals in a high frequency band. Such a configuration allows the wide-band vibrating device to function as a speaker, and can eliminate a speaker from a game controller. In this case, it is desirable to install the wide-band vibrating device on the game controller to improve the sound output efficiency in consideration of the structure or the back cabinet, the echo structure, the resonance structure, or the like.

Further, the present system generally outputs images and sounds of a game from an external apparatus such as a TV. Much delay in sounds in a TV system can cause the timing of images and sounds to disagree with the timing of vibration from a game controller. It is therefore conceivable that the system performs control to detect the presentation time difference (delay time) between images and sounds, and vibration (using a manual input of a user or automatic detection of an apparatus), and delay, for example, the presentation time of vibration.

Further, a user can feel, for example, a ball rolling in a game controller if vibration from a speaker in the game controller is presented at the same time as vibration from a wide-band vibrating device. Such a configuration makes it possible to present a situation in which a feel is generated from the inside of the game controller.

Further, the above describes the eccentric motor and the wide-band vibrating device. However, the present disclosure can also be applied to an LRA (linear actuator having a narrow reproduction frequency band). The LRA is responsive, and can characteristically control the vibration amplitude and the frequency independently. In a case where a single frequency is decided to drive the LRA, the above-described technique of controlling an eccentric motor can also be applied to the LRA (driven using AC signals having a fixed frequency instead of DC voltage). Further, in a case where the drive frequency is changed to control the LRA, the LRA is driving using analog vibration similar to that of a wide-band vibrating device. Accordingly, the above-described technique of controlling a wide-band vibrating device is also applied to the LRA. Further, the present disclosure may also be applied to a tactile feedback section that imparts tactile feedback about an electrical stimulus or heat.

10. Conclusion

As described above, according to an embodiment of the present disclosure, a game console changes control in accordance with the characteristics of a game controller including a vibrating device. Such a configuration allows a user to acquire high-definition tactile feedback using a game controller of the user.

More specifically, a vibration control mode is changed for a game controller to which an external vibrating unit including a vibrating device therein can be connected, in accordance with whether the external vibrating unit is mounted. Further, it is possible to feed back the touch of a virtual object by equipping a game controller with a wide-band vibrating device, and controlling the game controller using appropriate signals. Further, the compatibility with vibration feedback acquired by game software supporting a single vibrating device is ensured.

Further, control signals of a vibrating device may be generated in a game controller, or in a game console. Control signals obtained by mixing control signals generated in a game controller with control signals generated in a game console may also be generated. Further, control signals generated on the basis of software created for game controllers including only eccentric motors as vibrating devices may be appropriately converted into control signals for a wide-band vibrating device. This allows a user to acquire the tactile feedback corresponding to the characteristics of a game controller possessed by the user even when the user plays game software supporting only eccentric motors.

Further, in a case where a wide-band vibrating device is used, vibration feedback and sound feedback are concurrently output. Further, the waveform generation and the mixing process therefor have been described. Further, a single eccentric motor and a single wide-band vibrating device may be disposed at each of left and right grips of a game controller.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control section configured to generate a control signal that controls an operation of a tactile feedback apparatus including a tactile feedback section, in which the control section changes control on the tactile feedback apparatus on the basis of a type of the tactile feedback section which is recognized by the control section.

(2)

The information processing apparatus according to (1), in which the tactile feedback section includes a first tactile feedback section, and a second tactile feedback section that imparts tactile feedback different from tactile feedback of the first tactile feedback section.

(3)

The information processing apparatus according to (2), in which the first tactile feedback section vibrates with an amplitude corresponding to a frequency of vibration one to one, and the second tactile feedback section vibrates with an amplitude independent from a frequency of vibration.

(4)

The information processing apparatus according (2) or (3), in which the control section changes control on the tactile feedback apparatus on the basis of first software programmed to generate a signal for only the first tactile feedback section.

(5)

The information processing apparatus according to (4), in which the control section generates a control signal that operates the second tactile feedback section on the basis of a control signal for the first tactile feedback section which is generated from the first software.

(6)

The information processing apparatus according to (4), in which the control section generates a control signal that operates the second tactile feedback section on the basis of a sound signal generated from the first software.

(7)

The information processing apparatus according to any one of (4) to 6, in which the control section changes control on the tactile feedback apparatus further on the basis of second software programmed to generate control signals for the first tactile feedback section and the second tactile feedback section.

(8)

The information processing apparatus according to (7), in which the control section generates a control signal that operates the first tactile feedback section on the basis of a control signal for the second tactile feedback section which is generated from the second software.

(9)

The information processing apparatus according to (7), in which the control section combines a control signal for the first tactile feedback section with a control signal for the second tactile feedback section to generate a control signal that operates the first tactile feedback section, the control signals being generated from the second software.

(10)

The information processing apparatus according to (7), in which the control section changes control on the tactile feedback apparatus further on the basis of third software programmed to generate only a signal for the second tactile feedback section.

(11)

The information processing apparatus according to any one of (1) to 10, further including:

a communication section configured to communicate with the tactile feedback apparatus, in which the communication section receives an identifier indicating a characteristic of the tactile feedback apparatus from the tactile feedback apparatus, and the control section changes control on the tactile feedback apparatus on the basis of the identifier.

(12)

The information processing apparatus according to (11), in which the communication section transmits information used for generating a control signal for the tactile feedback apparatus to operate the tactile feedback section to the tactile feedback apparatus on the basis of the identifier.

(13)

The information processing apparatus according to any one of (2) to (10), in which the tactile feedback apparatus includes a first tactile feedback apparatus including the first tactile feedback section and/or the second tactile feedback section, and a second tactile feedback apparatus including the second tactile feedback section.

(14)

A control method including:

generating a control signal that controls an operation of a tactile feedback apparatus including a tactile feedback section; and changing control on the tactile feedback apparatus on the basis of a type of the tactile feedback section which is recognized.

(15)

An information processing system including:
a tactile feedback apparatus including a tactile feedback section; and
an information processing apparatus including a communication section configured to communicate with the tactile feedback apparatus, and a control section configured to generate a control signal that controls an operation of the tactile feedback apparatus, in which
the control section changes control on the tactile feedback apparatus on the basis of a type of the tactile feedback section which is recognized by the control section.

(16)

The information processing system according to (15), in which
the tactile feedback apparatus transmits an identifier to the information processing apparatus, the identifier indicating a characteristic of the tactile feedback apparatus.

(17)

An information processing apparatus including:
a control section configured to change control on a first tactile feedback apparatus on the basis of a connection of a second tactile feedback apparatus to the first tactile feedback apparatus, the second tactile feedback apparatus imparting tactile feedback that is different from tactile feedback of the first tactile feedback apparatus.

(18)

The information processing apparatus according to (17), in which
the first tactile feedback apparatus includes a first vibrator.

(19)

The information processing apparatus according to (18), in which
the second tactile feedback apparatus includes a second vibrator that generates vibration that is different from vibration of the first vibrator.

(20)

The information processing apparatus according to (19), in which
the second vibrator generates vibration having a waveform that is different from a waveform of vibration of the first vibrator.

(21)

The information processing apparatus according to (20), in which
the second vibrator generates vibration having a cycle that is different from a cycle of vibration of the first vibrator.

(22)

The information processing apparatus according to (21) or (21), in which
the second vibrator generates vibration having an amplitude that is different from an amplitude of vibration of the first vibrator.

(23)

The first tactile feedback apparatus presents a tactile sense by a technique of any of vibration, an electrical stimulus, and heat.

(24)

The information processing apparatus according to (17), in which
the control section performs different control on the first tactile feedback apparatus between time when the second tactile feedback apparatus is connected and time when a third tactile feedback apparatus is connected, the third tactile feedback apparatus performing a tactile feedback apparatus that is different from the second tactile feedback apparatus.

REFERENCE SIGNS LIST 100 display
102 speaker
200 game console
202, 302 CPU
204 memory
206 hard disk drive (HDD)
208 display
210 wireless communication interface
212 storage medium reading section
214 external connection terminal
216 audio interface
218 vibration signal generation section
220 sound signal generation section
222 mixer
224 controller-side feedback operation control section
300, 500, 600 game controller
314 wireless communication interface
316, 330, 408, 504 amplifier
320 stereo headphone/microphone terminal
322 eccentric motor
324 extension terminal
400 external vibrating unit
402 vibration signal input terminal
404 communication terminal
406 digital signal processor (DSP)
410, 508 wide-band vibrating device
412 stereo headphone/microphone terminal
414 battery
416 charging circuit
510 wide-band vibration switching switch

The invention claimed is:

1. An information processing apparatus, comprising:
a communication section configured to receive an identifier from a tactile feedback apparatus, wherein
the tactile feedback apparatus includes a tactile feedback section, and
the identifier indicates a characteristic of the tactile feedback apparatus; and a control section configured to:
determine a type of the tactile feedback section;
generate a control signal based on the identifier and the type of the tactile feedback section; and
control operation of the tactile feedback apparatus based on the generated control signal.

2. The information processing apparatus according to claim 1, wherein
the tactile feedback section includes a first tactile feedback section and a second tactile feedback section, and
a tactile feedback of the second tactile feedback section is different from a tactile feedback of the first tactile feedback section.

3. The information processing apparatus according to claim 2, wherein the tactile feedback apparatus includes:
a first tactile feedback apparatus including the first tactile feedback section, and
a second tactile feedback apparatus including the second tactile feedback section.

4. The information processing apparatus according to claim 2, wherein
the first tactile feedback section vibrates with a first amplitude having one to one correspondence with a frequency of the vibration of the first tactile feedback section, and
the second tactile feedback section vibrates with a second amplitude independent of a frequency of the vibration of the second tactile feedback section.

5. The information processing apparatus according claim 4, wherein the control section is further configured to:
generate a first signal for only the first tactile feedback section by a first application; and
control the first tactile feedback section based on the first signal.

6. The information processing apparatus according to claim 5, wherein
the control section is further configured to:
generate a second signal for the second tactile feedback section based on the first signal; and
control the second tactile feedback section based on the second signal.

7. The information processing apparatus according to claim 5, wherein the control section is further configured to:
generate a sound signal by the first application; and
control the second tactile feedback section based on the sound signal.

8. The information processing apparatus according to claim 5, wherein
the control section is further configured to:
generate a second signal, by a second application, for the first tactile feedback section;
generate a third signal, by the second application, for the second tactile feedback section; and
control the tactile feedback apparatus based on the second signal and the third signal.

9. The information processing apparatus according to claim 8, wherein the control section is further configured to control the first tactile feedback section based on the third signal for the second tactile feedback section.

10. The information processing apparatus according to claim 8, wherein the control section is further configured to:
combine the second signal with the third signal to generate a combined control signal; and
control the first tactile feedback section based on the combined control signal.

11. The information processing apparatus according to claim 8, wherein the control section is further configured to:
generate a fourth signal for the second tactile feedback section by a third application; and
control the second tactile feedback section based on the fourth signal.

12. The information processing apparatus according to claim 1, wherein
the communication section is further configured to transmit information to the tactile feedback apparatus based on the identifier, and
the information is associated with the generation of the control signal.

13. A control method, comprising:
receiving an identifier from a tactile feedback apparatus including a tactile feedback section, wherein the identifier indicates a characteristic of the tactile feedback apparatus;
determining a type of the tactile feedback section;
generating a control signal based on the identifier and the type of the tactile feedback section; and
controlling operation of the tactile feedback apparatus based on the generated control signal.

14. An information processing system, comprising:
a tactile feedback apparatus including a tactile feedback section, wherein
the tactile feedback apparatus is configured to transmit an identifier, and
the identifier indicates a characteristic of the tactile feedback apparatus; and an information processing apparatus including:
a communication section configured to receive the identifier from the tactile feedback apparatus; and
a control section configured to:
determine a type of the tactile feedback section;
generate a control signal based on the identifier and the type of the tactile feedback section; and
control operation of the tactile feedback apparatus based on the generated control signal.

15. The information processing system according to claim 14, wherein
the information processing apparatus is configured to transmit information to the tactile feedback apparatus based on the identifier, and
the information is associated with the generation of the control signal.

* * * * *